(12) United States Patent
Noh et al.

(10) Patent No.: US 10,638,489 B2
(45) Date of Patent: Apr. 28, 2020

(54) METHOD AND APPARATUS FOR MANAGING UE-TO-UE INTERFERENCE IN WIRELESS COMMUNICATION SYSTEM

(71) Applicant: Samsung Electronics Co., Ltd., Gyeonggi-do (KR)

(72) Inventors: Jeehwan Noh, Gyeonggi-do (KR); Jongbu Lim, Seoul (KR); Hyunil Yoo, Gyeonggi-do (KR); Yeohun Yun, Gyeonggi-do (KR); Taeyoung Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/803,268

(22) Filed: Nov. 3, 2017

(65) Prior Publication Data

US 2018/0124796 A1 May 3, 2018

(30) Foreign Application Priority Data

Nov. 3, 2016 (KR) .................. 10-2016-0146070

(51) Int. Cl.
*H04W 72/04* (2009.01)
*H04W 72/08* (2009.01)
(Continued)

(52) U.S. Cl.
CPC ........ *H04W 72/082* (2013.01); *H04B 1/1027* (2013.01); *H04W 28/04* (2013.01);
(Continued)

(58) Field of Classification Search
CPC .............. H04W 72/082; H04W 28/04; H04W 72/0426; H04W 24/02; H04W 16/14; H04B 1/1027
See application file for complete search history.

(56) References Cited

U.S. PATENT DOCUMENTS 9,461,786 B2 * 10/2016 Jeong .................. H04L 5/0026
2004/0213187 A1 * 10/2004 Fujii .................... H04B 7/0408
370/335
(Continued)

*Primary Examiner* — Jay P Patel
(74) *Attorney, Agent, or Firm* — The Farrell Law Firm, P.C.

(57) ABSTRACT

The present disclosure relates to a communication technique of fusing a 5G communication system for supporting higher data transmission rate beyond a 4G system with an IoT technology and a system thereof. The present disclosure may be used for an intelligent service (for example, smart home, smart building, smart city, smart car or connected car, health care, digital education, retail business, security and safety related service, or the like) based on the 5G communication technology and the IoT related technology.
A method of a first base station in a wireless communication system and the first base station are provided. The method includes identifying interference region information; receiving beam index information and resource allocating information from a second base station; and allocating a resource to a terminal based on the interference region information, the beam index information, and the resource allocation information. The first base station includes a transceiver; and a controller configured to identify interference region information, receive beam index information and resource allocation information from a second base station, and allocate a resource to a terminal based on the interference region information, the beam index information, and the resource allocation information.

10 Claims, 40 Drawing Sheets

520 — If there is interfering terminal in neighboring cells

530 — If there is no interfering terminal in neighboring cells

| * Based certain threshold [Presence or absence of interference] | BS2 receive index 1 | BS2 receive index 2 | BS2 receive index 3 | ... |
|---|---|---|---|---|
| BS1 transmit index 1 | 0 | X | X | |
| BS1 transmit index 2 | X | X | X | |
| BS1 transmit index 3 | 0 | 0 | X | |
| ... | X | X | 0 | |

510 — Interference region information

(51) Int. Cl.
    *H04B 1/10*          (2006.01)
    *H04W 28/04*       (2009.01)
    *H04W 16/14*       (2009.01)
    *H04W 24/02*       (2009.01)

(52) U.S. Cl.
    CPC ............ *H04W 16/14* (2013.01); *H04W 24/02* (2013.01); *H04W 72/0426* (2013.01)

(56) References Cited

U.S. PATENT DOCUMENTS

| | | | |
|---|---|---|---|
| 2010/0279619 A1* | 11/2010 | Yeh | H04B 7/024 455/63.1 |
| 2014/0146782 A1* | 5/2014 | Gerlach | H04W 72/0426 370/329 |
| 2014/0301383 A1* | 10/2014 | Sohn | H04B 7/0452 370/338 |
| 2015/0103784 A1* | 4/2015 | Lorca Hernando | H04L 5/0032 370/329 |
| 2015/0230266 A1* | 8/2015 | Sung | H04B 7/0413 370/329 |
| 2015/0282001 A1* | 10/2015 | Kwak | H04B 7/0617 370/229 |
| 2016/0072568 A1* | 3/2016 | Mun | H04L 1/0026 375/267 |
| 2017/0006613 A1* | 1/2017 | Kakishima | H04B 7/0413 |
| 2017/0195033 A1* | 7/2017 | Zhang | H04W 72/046 |
| 2017/0195998 A1* | 7/2017 | Zhang | H04B 7/086 |
| 2017/0346543 A1* | 11/2017 | Islam | H04B 7/0814 |
| 2017/0346544 A1* | 11/2017 | Islam | H04W 74/085 |
| 2019/0181922 A1* | 6/2019 | Lee | H04B 7/0695 |

\* cited by examiner

FIG. 15

|  | Beam correspondence capability ||
|  | TRP | Terminal |
| --- | --- | --- |
| Type 1 | O | O |
| Type 2 | X | X |
| Type 3 | X | O |
| Type 4 | O | X |

METHOD AND APPARATUS FOR MANAGING UE-TO-UE INTERFERENCE IN WIRELESS COMMUNICATION SYSTEM

PRIORITY

This application claims priority under 35 U.S.C. § 119(a) to a Korean Patent Application filed on Nov. 3, 2016, in the Korean Intellectual Property Office and assigned serial No. 10-2016-0146070, the entire disclosure of which is incorporated herein by reference.

BACKGROUND

1. Field of the Disclosure

The present disclosure relates to a wireless communication system, and more particularly, to a method and an apparatus for managing interference in a wireless communication system.

2. Description of the Related Art

To meet the demand for wireless data traffic which having increased since deployment of fourth generation (4G) communication systems, efforts have been made to develop an improved fifth generation (5G) or pre-5G communication system. Therefore, the 5G or pre-5G communication system is also called a "beyond 4G network" or a "post long term evolution (LTE) system." The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, analog beam forming, and large scale antenna techniques are discussed in 5G communication systems. In addition, in 5G communication systems, development for system network improvement is underway based on advanced small cells, cloud radio access networks (RANs), ultra-dense networks, device-to-device (D2D) communication, wireless backhaul, a moving network, cooperative communication, coordinated multi-points (CoMP), reception-end interference cancellation and the like. In the 5G system, hybrid frequency-shift keying (FSK) frequency and quadrature amplitude modulation (FQAM) and sliding window superposition coding (SWSC) as an advanced coding modulation (ACM), filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have recently been studied. Such an IoT environment may provide intelligent Internet technology services that create new value to human life by collecting and analyzing data generated among connected things. IoT may be applied to a variety of fields including smart home, smart building, smart city, smart car or connected cars, smart grid, health care, smart appliances and advanced medical services through the convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology. On the other hand, in the case of a terminal performing communication using a time division duplex (TDD) scheme, user equipment to user equipment (UE-to-UE) interference may occur when directions of data transmission/reception to and from neighboring terminals are different. As a result, a method for solving the problem is needed.

In addition, in the 5G communication system, a signal may be transmitted/received through beamforming. As a result, a method for determining a best beam pair is needed.

In addition, in a communication system, a phase distortion may occur due to phase noise. In a communication system using a very high frequency, performance degradation due to inter-carrier interference cannot be prevented only by phase error estimation in a symbol unit. Therefore, there is a need for a method for estimating and compensating for phase noise.

SUMMARY

An aspect of the present disclosure is to provide a method and an apparatus for managing interference even in a situation where an interference environment continuously changes due to movement of a terminal.

Another aspect of the present disclosure is to provide a method and a procedure for managing interference in real time in a system in which various heterogeneous services exist at the same time. By applying the method, scheduling can be performed without a delay due to coordination between base stations every time, thereby achieving real-time scheduling. In addition, the method for managing interference can address the UE-to-UE interference issue, so it is possible to increase efficiency and perform low latency communication by dynamic TDD.

Another aspect of the present disclosure is to provide, in a beamforming or multi-beam system, if beam correspondence may not be assumed in a transmit/receive point (TRP) or a UE, a downlink (DL) beam management result which is not utilized in an uplink (UL). For this reason, an UL beam management procedure and signaling are required.

Another aspect of the present disclosure provides a procedure and signaling for UL beam management.

Another aspect of the present disclosure provides an RS structure for estimating and compensating for phase noise.

In accordance with an aspect of the present disclosure, a method of a first base station in a wireless communication system is provided. The method includes identifying interference region information; receiving beam index information and resource allocating information from a second base station; and allocating a resource to a terminal based on the interference region information, the beam index information, and the resource allocation information.

In accordance with another aspect of the present disclosure, a first base station in a wireless communication system is provided. The first base station includes a transceiver; and a controller configured to identify interference region information, receive beam index information and resource allocation information from a second base station, and allocate a resource to a terminal based on the interference region information, the beam index information, and the resource allocation information.

According to an embodiment of the present disclosure, the time/frequency resources are allocated based on the interference region information, thereby enabling the real-time scheduling without the delay due to the coordination every time.

In addition, according to an embodiment of the present disclosure, the dynamic TDD operation in a subframe unit is enabled, such that the low latency service can be supported.

Also, according to an embodiment of the present disclosure, it is possible to increase the efficiency of the data transmission and reception using the dynamic TDD operation by solving the UE-to-UE interference problem.

According to another embodiment of the present disclosure, the base station and the terminal can perform the uplink signal transmission or reception by the procedure and the signaling method required for the UL beam management.

According to another embodiment of the present disclosure, it is possible to prevent the reduction in performance by estimating and compensating for the phase noise.

The effects that may be achieved by the embodiments of the present disclosure are not limited to the above-mentioned objects. That is, other effects that are not mentioned may be obviously understood by those skilled in the art to which the present disclosure pertains from the following description.

BRIEF DESCRIPTION OF THE DRAWINGS

The above and other aspects, features, and advantages of the present disclosure will be more apparent from the following detailed description, taken in conjunction with the accompanying drawings, in which:

FIG. 15 is a chart of an UL beam management type depending on beam correspondence capability according to an embodiment of the present disclosure;

DETAILED DESCRIPTION OF EMBODIMENTS OF THE PRESENT DISCLOSURE

Figure 1:
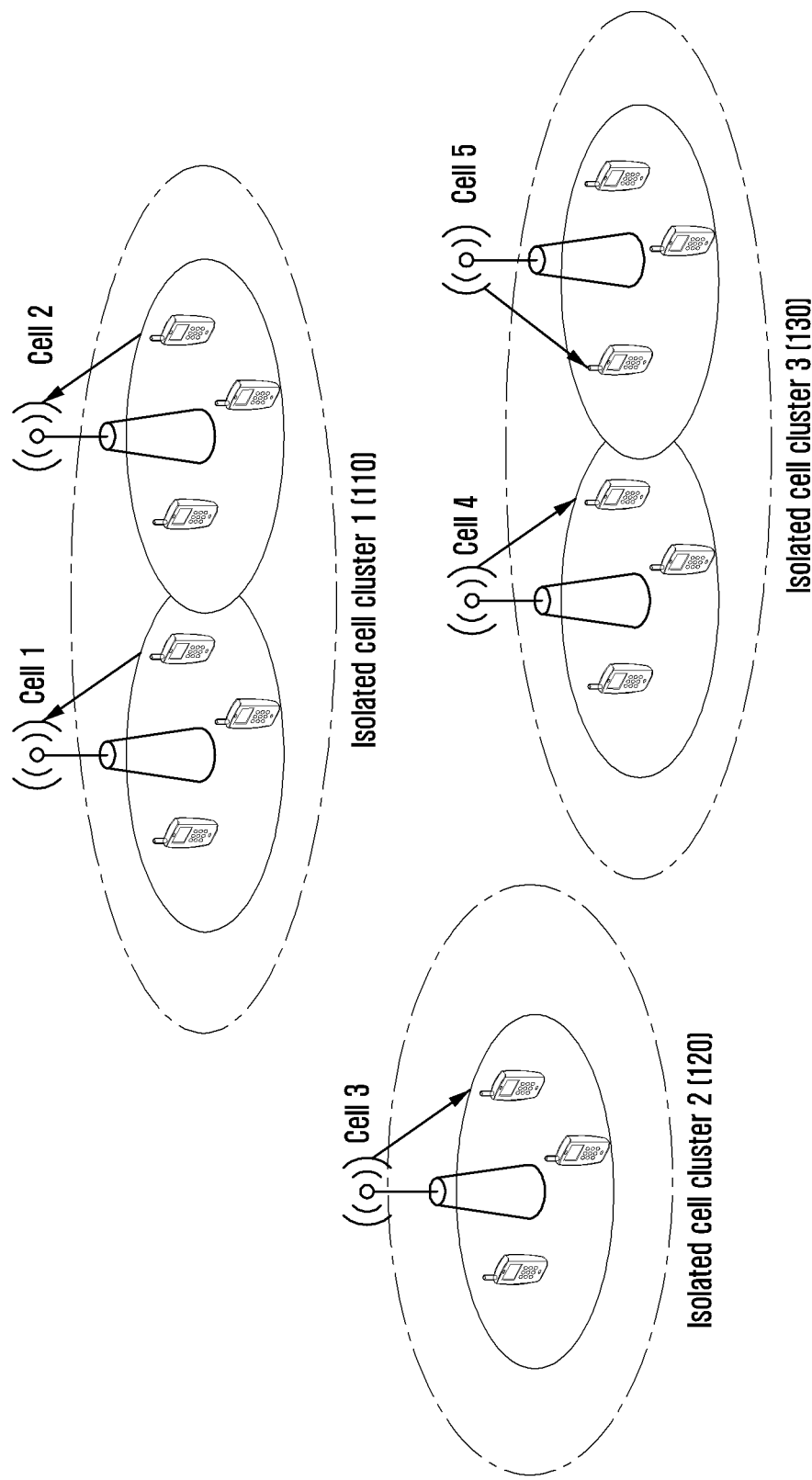
FIG. 1 is an illustration of a method of managing a UE-to-UE interference using existing clustering.

Hereinafter, embodiments of the present disclosure are described in detail with reference to the accompanying drawings. In addition, like reference numerals denote like elements in the accompanying drawings. Further, detailed descriptions related to well-known functions or configurations are omitted in order to not unnecessarily obscure the subject matter of the present disclosure.

In describing the embodiments of the present disclosure, a description of technical contents which are well known to the art to which the present disclosure belongs and are not directly connected with the present disclosure are omitted. This is to more clearly convey the present disclosure by omitting unnecessary description.

In addition, some components are exaggerated, omitted, or schematically illustrated in the accompanying drawings. Further, the size of each component may not necessarily reflect its actual size. In each of the accompanying drawings, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but may be implemented in various forms. The descriptions of the embodiments make the present disclosure complete and are provided so that those skilled in the art can easily understand the present disclosure. Therefore, the scope of the present disclosure is defined by the appended claims and their equivalents. Like reference numerals throughout the description denote like elements.

In addition, it may be understood that each block of processing flowcharts and combinations of the flowcharts may be performed by computer program instructions. Since these computer program instructions may be loaded in processors of a general computer, a special computer, or other programmable data processing apparatuses, these instructions executed by the processors for the computer or the other programmable data processing apparatuses create means performing functions described in the block(s) of the flowcharts. Since these computer program instructions may also be stored in a usable computer or a non-transitory computer-readable memory of a computer or other programmable data processing apparatuses in order to implement the functions in a certain scheme, the computer program instructions stored in the usable computer or non-transitory computer-readable memory may also produce manufacturing articles including instruction means for performing the functions described in the block(s) of the flowcharts. Since the computer program instructions may also be loaded onto the computer or the other programmable data processing apparatuses, the instructions for performing a series of operation steps on the computer or the other programmable data processing apparatuses to create processes executed by the computer to thereby execute the computer or the other programmable data processing apparatuses may also provide steps for performing the functions described in the block(s) of the flowcharts.

In addition, each block may indicate some of modules, segments, or code including one or more executable instructions for executing a certain logical function(s). Further, functions described in the blocks occur regardless of a sequence in some alternative embodiments. For example, two blocks that are consecutively illustrated may be simultaneously performed or performed in a reverse sequence.

The term "unit" used in the present embodiment indicates software or hardware components such as a field programmable gate array (FPGA) and an application specific integrated circuit (ASIC) that performs any role. However, the term "unit" is not limited to software or hardware. The term "unit" may indicate a component configured in a storage medium that may be addressed and may also indicate a component configured to reproduce at least one processor. Accordingly, for example, the term "unit" includes components such as software components, object oriented software components, class components, task components and processors, functions, attributes, procedures, subroutines, segments of program code, drivers, firmware, microcode, a circuit, data, a database, data structures, tables, arrays, and variables. The functions provided in the components and the term "unit" may be combined with a smaller number of components and the term "unit" or may be further separated into additional components and the term "unit." In addition, the components and the term "unit" may also be implemented to reproduce at least one central processing unit (CPU) within a device or a security multimedia card. Efforts to develop an improved 5G communication system after the commercialization of the 4G communication system have been conducted.

The main feature of the 5G communication system is to support various service scenarios having different requirements as compared to the 4G communication system. The requirements may indicate latency, data rate, battery life, a number of concurrent connected users, coverage, and the like.

For example, an enhanced mobile broadband (eMBB) service may indicate a service for supporting a data rate that is 100 times or greater than that of the 4G communication system and may be regarded as a service for supporting fast growing user data traffic.

For example, an ultra reliable and low latency (URLL) service aims at very high data transmission/reception reliability and very low latency as compared to a 4G communication system, and may be used for services using an autonomous vehicle, electronic health (e-health), a drone, or the like.

For example, a massive machine-type-communication (mMTC) service aims to support a larger number of device-to-device communications per single area than a 4G communication system, and is an evolved service of the 4G MTC such as smart metering.

The present disclosure relates to a technique capable of addressing a UE-to-UE interference problem occurring in a dynamic TDD system and improving frequency efficiency and latency by configuring different uplink/downlink between base stations reflecting traffic characteristics of the respective base stations.

The dynamic TDD scheme may be applied to increase efficiency of using a frequency and reduce latency in an environment where various services capable of supporting a 5G communication system coexist. That is, different uplink or downlink between base stations may be established depending on traffic characteristics of the respective base stations, thereby increasing the efficiency of using a frequency and reducing latency. However, if different uplink and downlink between base stations are established, the UE-to-UE interference issue may occur. Accordingly, the present disclosure proposes a method and an apparatus for mitigating UE-to-UE interference.

In addition, a base station of the present disclosure described below may include a TRP, a relay node, a relay transmission reception point (RTRP), and a base station (BS).

FIG. 1 is an illustration of a method of managing a UE-to-UE interference using existing clustering.

In the case of using a clustering method, the base stations or cells having a large interference influence are clustered into one cluster, and all the base stations in the cluster may apply the same uplink/downlink (UL/DL) configuration.

Referring to FIG. 1, cell 1 and cell 2 which each have a large interference influence may be clustered into cluster 1 110, cell 3 may be clustered into cluster 2 120, and cell 4 and cell 5 may be clustered into cluster 3 130. Cells having a large interference are clustered into one cluster, and the base stations clustered into the cluster may apply the same UL/DL configuration. For example, in cell 1 and cell 2 included in cluster 1 110, only the uplink transmission may be performed at a certain time, and in cell 4 and cell 5 included in cluster 3 130, only the downlink transmission may be performed at a certain time. In addition, each cluster is isolated and may be unaffected by other clusters because of small interference.

However, if all the base stations in the cluster apply the same UL/DL configuration, the average user data rate which can be achieved or the latency that can be reduced may be limited.

In addition, in the TDD system, each base station may change the UL/DL configuration by reflecting traffic characteristics. For example, a base station can apply different UL/DL configurations to terminals included in the same cluster as in cluster 1 (110) according to the traffic characteristics. However, in the case of applying dynamic TDD as described above, UE-to-UE interference may occur. Accordingly, a method for addressing the issue is needed. However, the present disclosure is not limited thereto. That is, the present disclosure may apply to a situation where terminals use different UL/DL configurations even when dynamic TDD is not applied.

Figure 2:
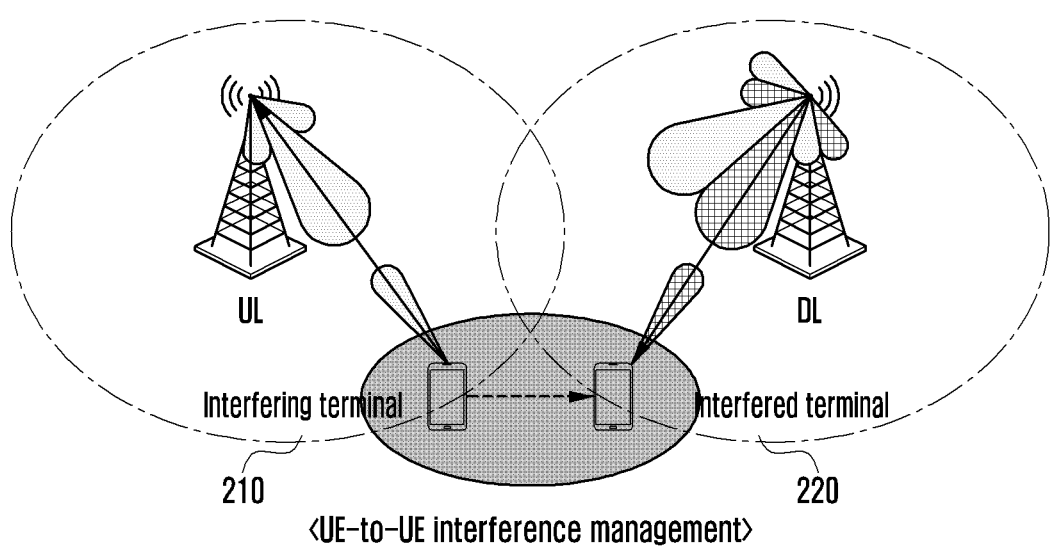
FIG. 2 is an illustration of UE-to-UE interference according to an embodiment of the present disclosure.

FIG. 2 is an illustration of UE-to-UE interference according to an embodiment of the present disclosure.

Referring to FIG. 2, an interfering terminal 210 may transmit an uplink signal and an interfered terminal 220 may receive a downlink signal according to the configuration of the base station. In the present disclosure, a signal may include at least one of data or control information. As described above, if different UL/DL configurations are set for neighboring terminals, the uplink signal that the interfering terminal 210 transmits may act as interference when the interfered terminal 220 receives the downlink signal from the base station. Therefore, there is a need for a method of addressing UE-to-UE interference.

In addition, considering UE-to-UE interference characteristics, an interference environment continuously changes due to movement of a terminal. That is, a signal that the interfering terminal 210 transmits at a current time (nth slot/subframe) may not act as interference at another time ((n+k)th slot/subframe). Alternatively, a terminal that does not act as interference at a current time may interfere with other terminals at another time (subframe/slot). Therefore, there is a need for a method of predicting a UE-to-UE interference situation in advance and allocating resources.

In addition, a feature of a 5G communication system must support multiple services (e.g., URLLC & eMBB) simultaneously. In this case, since the URLLC service requires low latency support, it is difficult to perform interference management using inter-base station coordination based on currently measured UE-to-UE interference information. Therefore, there is a need for a method of managing interference on a non-coordination basis or a pre-coordination basis.

Figure 3:
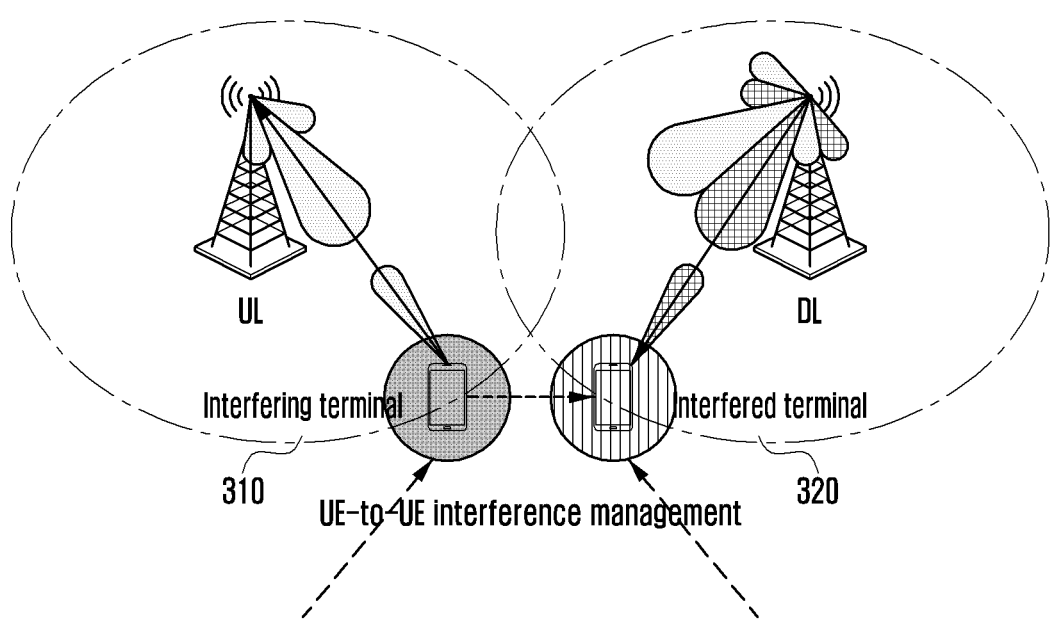
FIG. 3 is an illustration of a method of managing interference according to an embodiment of the present disclosure.

FIG. 3 is an illustration of a method of managing interference according to an embodiment of the present disclosure.

Referring to FIG. 3, a terminal affected by interference may be referred to as an interfered terminal, a first terminal, or a victim terminal. In addition, a serving base station of the first terminal may be referred to as a first base station or a downlink base station (DL base station).

In addition, a terminal which acts as interference may be referred to as an interfering terminal, a second terminal, or an aggressor terminal. In addition, a serving base station of the second terminal may be referred to as a second base station or an uplink base station (UL base station).

However, the present disclosure is not limited thereto. A term referring to a certain terminal or a base station, such as referring to an interfering terminal as the first terminal and the interfered terminal as the second terminal, may be changed.

In an embodiment of the present disclosure, a base station may generate interference region information based on a beam index. In this case, the interference region information may be generated and shared or generated by either the first base station or the second base station.

For example, a first base station to which a first terminal (or interfered terminal) 320 belongs may transmit resource allocation information and beam index information to a second base station. That is, the first base station transmits to the second base station the intention to transmit data or control information onto resource block (RB) {x} using a transmit beam index {y}.

Accordingly, the second base station (UL base station) to which the second terminal (or interfering terminal) 310 belongs allocates resources to a UE (interfering terminal) that may act as interference in consideration of the resource allocation information (corresponding RB{x}) and the transmit beam index (beam index {y}) of the first base station upon the UL scheduling. That is, the second base station (UL base station) may generate the interference region information based on the receive beam of the second base station, and allocate resources based on the generated interference region information. For example, if the first base station uses the transmit beam index {y}, the second base station may select resources from all available RBs regardless of the resource allocation information of the first base station and allocate the selected resources to a second terminal (UL UE) in a region in which the second terminal does not interfere with other terminals. In contrast, if the first base station uses the transmit beam index {y}, the second base station may select resources from the RBs other than the resource allocation information (RB{x}) of the first base station and allocate the selected resources to a first terminal (UL UE) in the region in which the first terminal interferes with other terminals. In the present disclosure, the region in which the second terminal interferes with the first terminal or the region in which the first terminal receives interference from the second terminal may be referred to as an interference region. However, the present disclosure is not limited thereto, and the interference region may include the region in which the terminal receives interference from other terminals or the base station or the region in which the terminal interferes with other terminals or the base station.

Figure 4A:
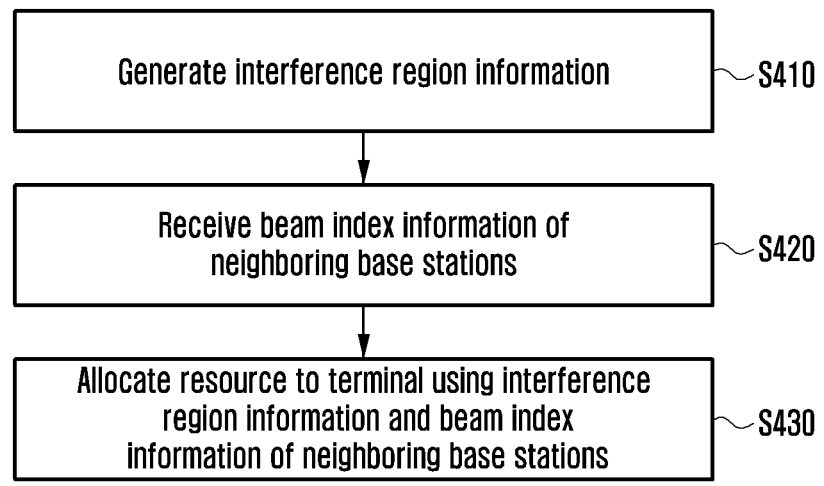
FIG. 4A is a flowchart of a method of managing interference according to an embodiment of the present disclosure.

FIG. 4A is a flowchart of a method of managing interference according to an embodiment of the present disclosure.

Referring to FIG. 4A, a base station may generate interference region information in step S410. The interference region information may be performed in cooperation with neighboring base stations. The interference region information may be generated independently by each base station and shared. Alternatively, a master base station may be selected to generate the interference region information and share the interference region information with neighboring base stations. Accordingly, the base station may receive the interference region information instead of generating the interference region information in step S410. A certain procedure for generating the interference region information is described below in greater detail. In step S420, the base station may receive beam index information of the neighboring base stations from the neighboring base stations. In addition, the base station may receive resource allocation information from the neighboring base stations. The beam index information of the neighboring base stations may include at least one of a receive beam by which neighboring base stations receive an uplink signal or a transmit beam by which neighboring base stations transmit a downlink signal. In addition, the resource allocation information may include at least one of an uplink resource and a downlink resource that neighboring base stations allocate to a serving terminal.

In step S430, the base station may allocate resources to the terminal using the interference region information and the beam index information of the neighboring base stations.

For example, the base station may identify whether the terminals of the neighboring base stations are located in the interference region using the beam index of the neighboring base stations and the interference region information. In this case, the terminals of the neighboring base stations may be the interfering terminal or the interfered terminal. Here, as described above, the interference region may indicate a region in which a terminal acts as interference or receives interference. Therefore, if the terminal of the base station is located in the interference region, the base station may allocate resources other than the resources allocated to the terminal to the serving terminal of the base station.

Figure 4B:
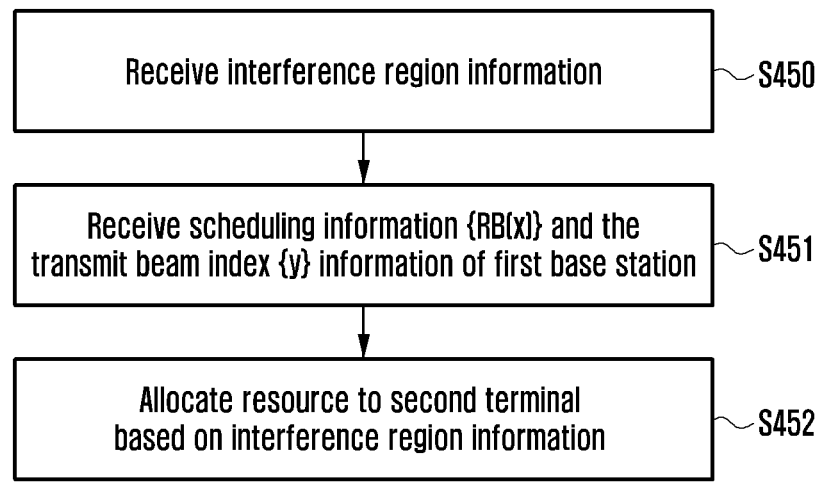
FIG. 4B is a flowchart of a method of allowing a second base station to which an interfering second terminal belongs to perform scheduling based on scheduling information of a first base station to which an interfered first terminal belongs.

FIG. 4B is a flowchart of a method of allowing a base station (e.g. second base station) to which an interfering terminal (e.g. second terminal) belongs to perform scheduling based on scheduling information of a base station (e.g. first base station) to which an interfered terminal (e.g. first terminal) belongs.

Referring to FIG. 4B, in step S450, the second base station may receive the interference region information. As described above, the second base station may receive the interference region information that other base stations generate. Alternatively, the second base station may directly generate the interference region information. The details are the same as those described above with reference to FIG. 4A.

In step S451, the second base station (e.g. UL base station) may receive from the first base station the scheduling information (e.g. RB {x}) and the transmit beam index {y} information that the first base station intends to use in the downlink.

Accordingly, in step S452, the second base station may allocate resources to the second terminal based on the interference region information. For example, if the second terminal is located in the region in which the second terminal has an inference of interference on the first terminal (e.g. DL UE) using the transmit beam index {y} of the first base station, the second base station may select resources from the RB other than the RB {x} and allocate the selected resources. In this case, the first terminal using the transmit beam index {y} of the first base station may refer to the first terminal receiving the signal transmitted through the transmit beam index {y} of the first base station.

In addition, if the second terminal does not interfere with the first terminal (e.g. DL UE) using the transmit beam index {y} of the first base station, the second base station may select resources from all available RBs without considering the resource allocation information of the first base station and allocate the selected resources.

Figure 4C:
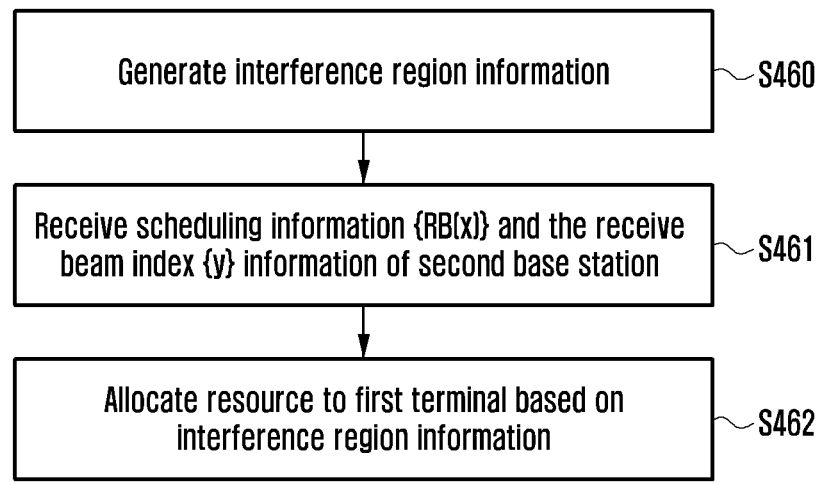
FIG. 4C is a flowchart of a method of allowing a first base station to which an interfered first terminal belongs to perform scheduling based on scheduling information of a second base station to which an interfering second terminal belongs.

FIG. 4C is a flowchart of a method of allowing a base station (e.g. first base station) to which the interfered terminal (e.g. first terminal) belongs to perform scheduling based on scheduling information of the base station (e.g. second base station) to which the interfering terminal (e.g. second terminal) belongs.

Referring to FIG. 4C, in step S460, the first base station may generate an interference region information. Alternatively, as described above, the first base station may receive the interference region information from other base stations, and the details thereof are the same as those described above with reference to FIG. 4A.

In step S461, the second base station may receive from the second base station scheduling information (e.g. RB {x}) and the receive beam index {y} information that the second base station intends to use in uplink downlink.

Accordingly, in step S462, the first base station may allocate resources to the first terminal based on the interference region information. For example, if the first terminal is located in the region in which the first terminal receives interference from the second terminal (e.g. UL UE) using the transmit beam index {y} of the second base station, the first base station may select resources from the RB other than the RB {x} and allocate the selected resources. In this case, the second terminal using the receive beam index {y} of the second base station may refer to the second terminal transmitting the uplink signal so that the second base station receives the signal through the receive beam index {y}.

In addition, if the first terminal is not affected by interference from the second terminal (e.g. UL UE) using the receive beam index {y} of the second base station, the first base station may select resources from all available RBs without considering the resource allocation information of the first base station and allocate the selected resources.

Figure 5:
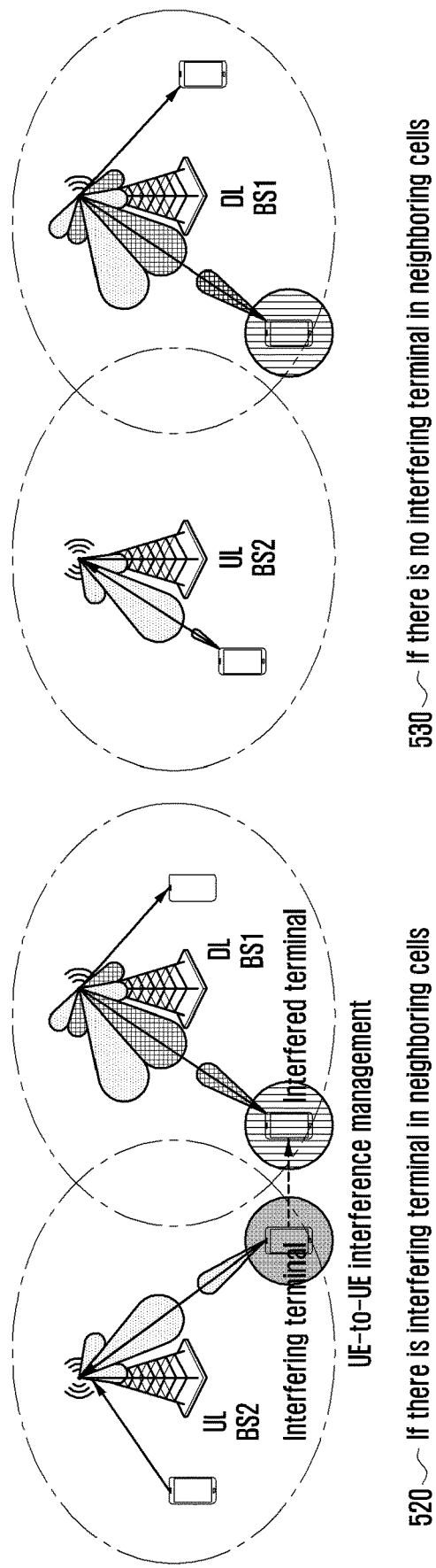
FIG. 5 is an illustration of a method of generating UE-to-UE interference region information according to an embodiment of the present disclosure.

FIG. 5 is an illustration of a method of generating UE-to-UE interference region information according to an embodiment of the present disclosure.

Referring to FIG. 5, for interference measurement, a base station may be configured so that a terminal periodically or aperiodically (e.g. triggering of the base station) monitors a UL signal. In a 5G system, the DL/UL configuration is most preferentially considered as an OFDMA scheme. In this case, it is possible to much more easily monitor an UL signal. Like LTE, even when the UL/DL uses different multiple access schemes, the UE with a device-to-device (D2D) function can receive the uplink signal, so the UE may monitor a normal UL interval, not a D2D interval.

When a certain terminal acquires interference strength information of neighboring interfering terminals (e.g. UL UEs) and feedbacks the corresponding information to a base station, the terminal may monitor a whole band or some of the band, feedback information on the whole band or some of the band, and feedback monitoring information to the base station if there is a region in which a frequency band is greater than or equal to a certain threshold by being divided into sub-bands.

A certain UE may feedback interference strength itself of an interfering terminal (e.g. UL UE) to a base station or feedback only the presence or absence of the interfering terminal (e.g. UL UE).

In addition, in order to generate the interference region information, base stations exchange interference information (e.g. interference strength or presence or absence of an interfering terminal (e.g. UL UE)) fed back from the UEs and transmit beam information of the base station used at transmission time interval (TTI)/subframe/slot in which interference is measured or the receive beam information of the base station in the corresponding cell with each other. The base station generates the inter-user interference region information using the information.

That is, when the transmit beam index of the base station of the interfered terminal and the receive beam index pair of the base station of the interfering terminal are each used for transmission and reception, the interference region information may be generated whether or not the interference occurs. In this case, the interference region information may be generated in a form of a table as illustrated in FIG. 5. However, the present disclosure is not limited thereto, and the interference region information may be configured in various forms.

A base station may sequentially update the interference region information with respect to different transmit/receive beam indexes of an UL/DL base station. In one embodiment of the present disclosure, the base station sets all items of interference region information 510 to be "X" (no interference) and performs an update to "0" (e.g. presence of interference) only for the transmit/receive beam index pair with a certain interference strength threshold or higher, thereby generating the interference region information.

A method of generating interference region information is described below by way of example.

If an interfering terminal exists in neighboring cells (520), a receive beam index that the second base station uses in order to receive the signal of the interfering terminal may be 1, and a transmit beam index that the first base station uses in order to transmit a signal to an interfered terminal may be 1. In this case, the interfered terminal may inform the base station that the interference strength or the interfering terminal exists.

In addition, if there is no interfering terminal in the neighboring cells (530), the transmit beam index that the first base station uses to transmit the signal to the interfered terminal may be 1, and the receive beam index that the second base station uses in order to receive the signal of the interfering terminal may be 2. In such a case, the interfered terminal may inform the base station that interference does not exist.

Accordingly, like the interference region information 510, the base station may generate the interference region information where a pair of the transmit beam index 1 and the receive beam index 1 is denoted by 0 and a pair of the transmit beam index 1 and the receive beam index 2 is denoted by X. In this way, the base station may generate the interference region information whether the interference occurs depending on the combination of the transmit beam index and the receive beam index.

Figure 6:
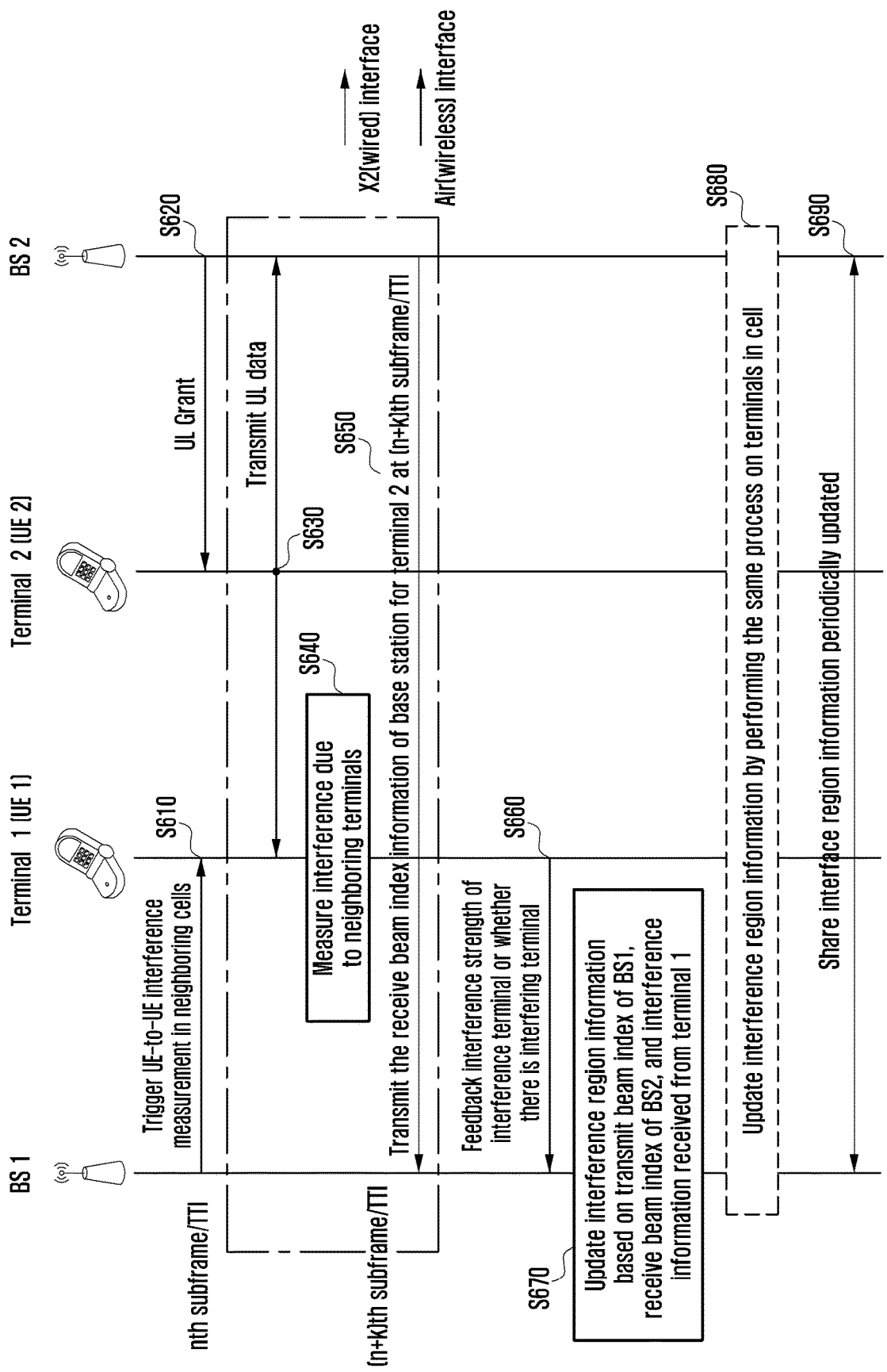
FIG. 6 is a flow diagram of a method of generating interference region information according to an embodiment of the present disclosure.

FIG. 6 is a flow diagram of a method of generating interference region information according to an embodiment of the present disclosure.

Referring to FIG. 6, in step S610, a first base station BS1 may trigger UE-to-UE interference measurement in neighboring cells. The BS1 transmits a message for triggering UE-to-UE interference measurement in neighboring cells to a terminal UE1 at an nth subframe/slot/TTI.

In step S620, a second base station BS2 may transmit an UL grant to a terminal UE2. In step S630, the UE2 receiving the UL grant transmits a UL signal (e.g. UL control information or UL data) through the allocated resource. In this case, the terminal may transmit the uplink signal at an (n+k)th subframe/TTI.

In step S640, the UE1 measures interference due to neighboring UEs by receiving a signal transmitted from the UE2 to the BS2.

In addition, in step S650, the BS2 transmits the receive beam index information of the BS2 for the UE2 to the BS1. The BS2 may transmit the receive beam index information of the BS2 to the BS1 at an (n+k)th subframe/slot/TTI. The information may be transmitted over a wired channel such as an X2 interface. However, the present disclosure is not limited thereto, and the time at which the interference measurement is triggered and the time at which the UL signal and the receive beam index information are transmitted may be changed.

In step S660, the UE1 may feedback the interference strength of the interfering terminal or the presence or absence of the interfering terminal.

Accordingly, in step S670, the BS1 may update the interference region information. The BS1 updates the interference region information based on the receive beam index information of the BS2 received from the BS2, the transmit beam index of the BS1, and the UE-to-UE interference information in neighboring cells received from the UE1.

In step S680, the BS1 performs the same process on the UEs in the cell to update the interference region information. In step S690, the BS1 may periodically share the updated interference region information with the neighboring base stations.

In addition, the BS1 may allocate resources to the UE1 using the generated interference region information, and the BS2 may allocate resources to the UE2 using the received interference region information. However, the present disclosure is not limited thereto, and the BS2 may receive the interference information measured by the UE1 and the transmit beam index of the BS1, and generate and update the interference region information using the received interference information and transmit beam index to allocate resources to the UE2.

Figure 7:
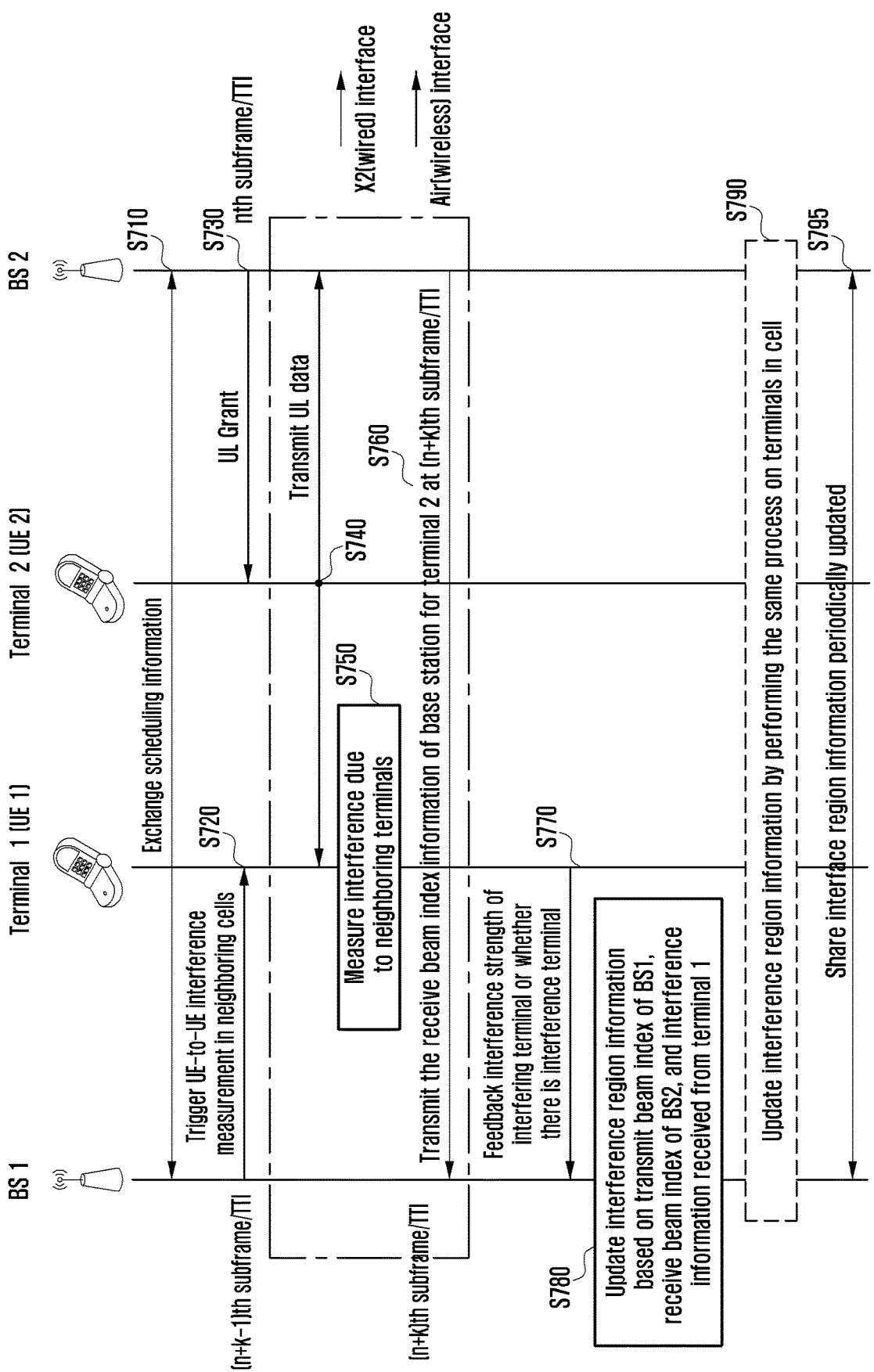
FIG. 7 is a flow diagram of a method of generating interference region information according to an embodiment of the present disclosure.

FIG. 7 is a flow diagram of a method of generating interference region information according to an embodiment of the present disclosure.

Referring to FIG. 7, in step S710, the BS1 and the BS2 may exchange scheduling information. The BS1 and the BS2 exchange the scheduling information. The BS1 and the BS2 may exchange the scheduling information at an (n−m)th subframe/slot/TTI. The information may be transmitted over a wired channel such as an X2 interface, where m is an integer greater than zero.

Thus, the BS1 and the BS2 may exchange the scheduling information, so the BS1 can know the time at which the BS1 transmits the signal of the terminals of the neighboring base stations and can trigger the UE-to-UE interference measurement in neighboring cells at a more accurate time. Therefore, it is possible to reduce the possibility that the base station wrongly determines that interference occurs where interference does not occur.

In step S720, the BS1 transmits a message triggering UE-to-UE interference measurement in neighboring cells to the terminal UE1. The BS1 may transmit a message triggering UE-to-UE interference measurement in neighboring cells at an (n+k−1)th subframe/slot.

In step S730, the BS2 may transmit an UL grant to the terminal UE2. In step S740, the UE2 receiving the UL grant may transmit the UL signal through the allocated resource. In this case, the terminal may transmit UL data at an (n+k)th subframe/slot/TTI. Here, k is an integer greater than 0.

Therefore, in step S750, the UE1 receives data transmitted from the UE2 to the BS2 to measure the interference due to the neighboring UEs.

In step S760, the BS2 transmits receive beam index information of the BS2 for the UE2 to the BS1. In this case, the BS2 may transmit the receive beam index information of the BS2 for the UE2 at an (n+k)th subframe/slot/TTI. However, the present disclosure is not limited thereto, and the time at which the scheduling information is exchanged, the time at which the interference measurement is triggered, and the time at which the UL signal and the receive beam index information are transmitted may be changed.

In step 770, the UE1 may feedback the interference strength of the interfering terminal or whether there is an interfering terminal.

Accordingly, in step S780, the BS1 may update the interference region information. For example, the BS1 updates the interference region information based on the receive beam index information of the BS2 received from the BS2, the transmit beam index of the BS1, and the UE-to-UE interference information in neighboring cells received from the UE1.

In addition, in step S790, the BS1 performs the same process on the UEs in the cell to update the interference region information. In step S795, the BS1 may periodically share the updated interference region information with the neighboring base stations. The interference region information may be transmitted over a wired channel such as the X2 interface.

In addition, the BS1 may allocate resources to the UE1 using the generated interference region information, and the BS2 may allocate resources to the UE2 using the received interference region information. However, the present disclosure is not limited thereto, and the BS2 may receive the interference information measured by the UE1 and the transmit beam index of the BS1, and generate and update the interference region information using the received interference information and transmit beam index to allocate resources to the UE2.

Figure 8:
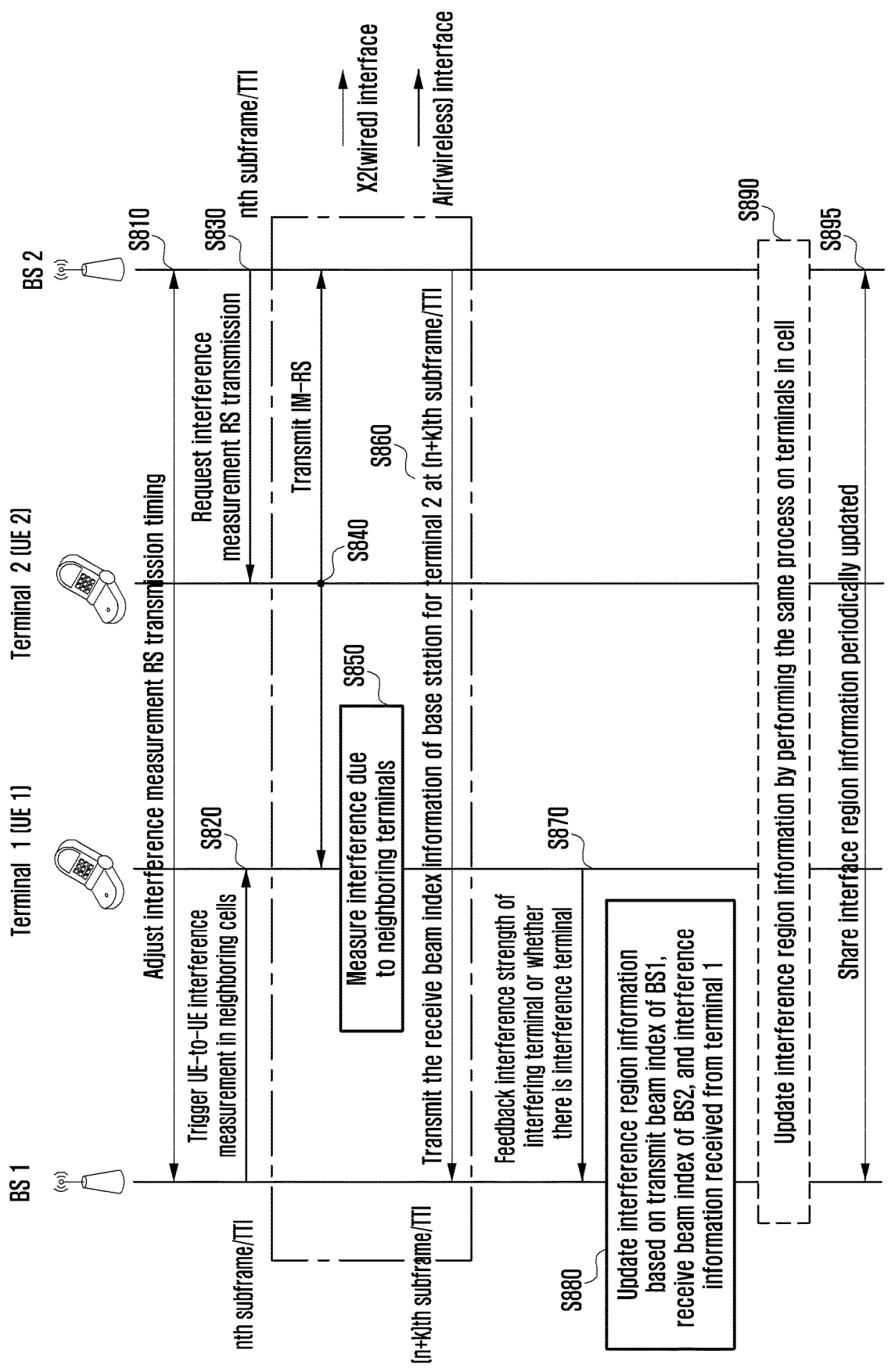
FIG. 8 is a flow diagram of a method of generating interference region information according to an embodiment of the present disclosure.

FIG. 8 is a flow diagram of a method of generating interference region information according to an embodiment of the present disclosure.

Referring to FIG. 8, in step S810, the BS1 and BS2 may adjust a transmission timing of an RS for interference measurement. In this case, the BS1 and the BS2 may adjust the transmission timing of the RS for the interference measurement at an (n−m)th subframe/slot/TTI.

In step S820, the base station may transmit a message triggering UE-to-UE interference measurement in neighboring cells to the UE1. In this case, the BS1 may transmit the message to the terminal UE1 in an nth subframe/slot/TTI.

In step S830, the BS2 may request the UE2 to transmit an interference measurement RS (IM-RS), and in step S840, the UE2 which receives the request of the IM-RS transmission may transmit the IM-RS through a promised resource.

In step S850, the UE1 measures interference due to neighboring UEs by receiving the IM-RS transmitted from the UE2 to the BS20.

In step S860, the BS2 transmits the receive beam index information of the BS2 for the UE2 to the BS1. In this case, the BS1 may transmit the receive beam index information of the BS2 for the UE2 at an (n+k)th subframe/slot/TTI. However, the present disclosure is not limited thereto, and the time at which the transmission timing of the interference measurement RS is adjusted, the time at which the interference measurement is triggered, and the time at which the IM-RS signal and the receive beam index information are transmitted may be changed.

In step 870, the UE1 may feedback the interference strength of the interfering terminal or whether there is an interfering terminal.

Accordingly, in step S880, the BS1 may update the interference region information. For example, the BS1 updates the interference region information based on the receive beam index information of the BS2 received from the BS2, the transmit beam index of the BS1, and the UE-to-UE interference information in neighboring cells received from the UE1.

In addition, in step S890, the BS1 performs the same process on the UEs in the cell to update the interference region information. In step S895, the BS1 may periodically share the updated interference region information with the neighboring base stations. The interference region information may be transmitted over a wired channel such as the X2 interface.

In addition, the BS1 may allocate resources to the UE1 using the generated interference region information, and the BS2 may allocate resources to the UE2 using the received interference region information. However, the present disclosure is not limited thereto, and the BS2 may receive the interference information measured by the UE1 and the transmit beam index of the BS1, and generate and update the interference region information using the received interference information and transmit beam index to allocate resources to the UE2.

Figure 9:
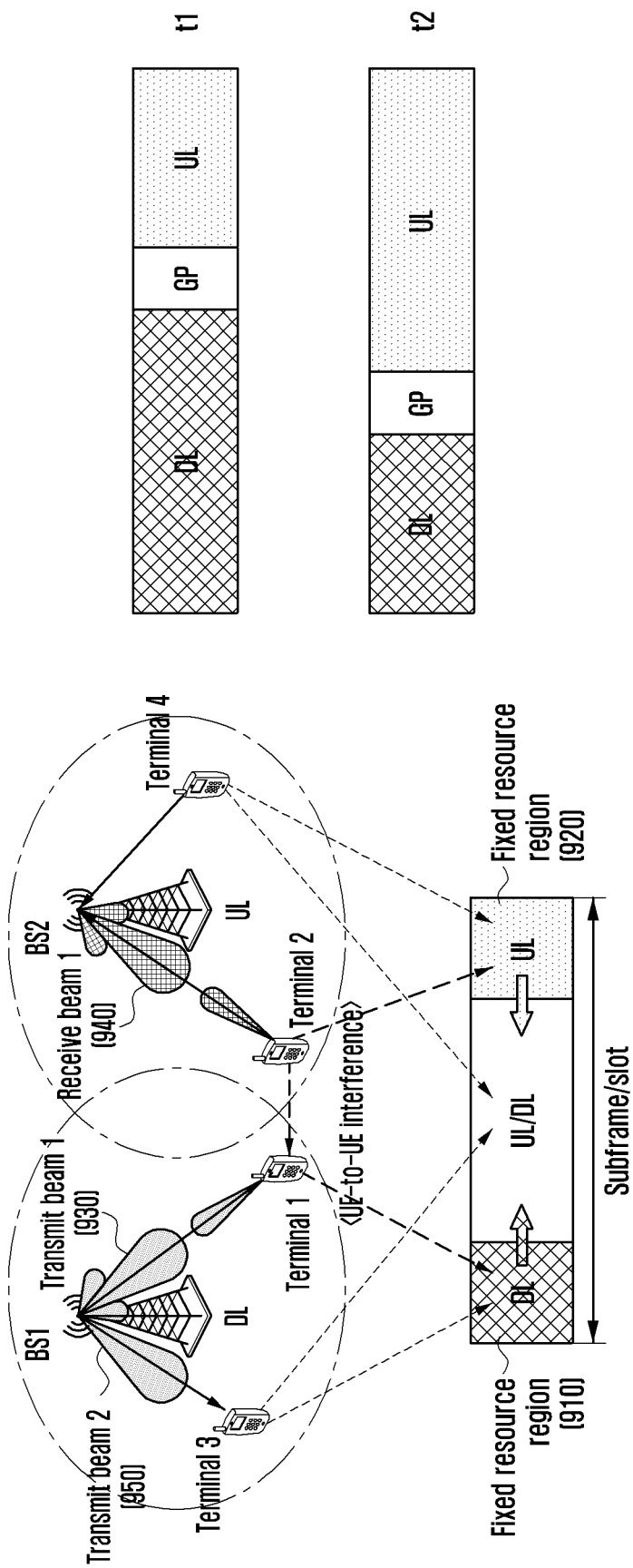
FIG. 9 is an illustration of a method of managing interference using an interference region information based frame structure according to an embodiment of the present disclosure.

FIG. 9 is an illustration of a method of managing interference using an interference region information based frame structure according to an embodiment of the present disclosure.

Latency may occur when a base station transmits beam index information and resource allocation information from neighboring base stations. Therefore, the above-mentioned method cannot adjust the interference in the URLLC service for the purpose of providing a low-latency service, and a method for providing a low-latency service is described below.

Referring to FIG. 9, fixed regions 910 and 920 for DL or UL may be allocated for the interference management. That is, the base station may allocate resources of a fixed region for the DL or the UL to the UE located in the interference region. As described above, the interference region may indicate the region in which a terminal interferes with other terminals or the region in which the terminal receives interference from other terminals. Accordingly, a base station may identify whether a terminal is located in the interference region by using a receive beam index which is used by the base station to receive a signal from an uplink terminal or a transmit beam index and the interference region information which are used by the base station to transmit the signal to a downlink terminal.

The fixed region for the DL or UL may be flexibly operated by long-term coordination. Neighboring base stations equally set the fixed region, and the base station preferentially allocates the fixed region resource to the base station located in the interference region.

A first terminal (e.g. Terminal 1) may be affected by the interference from a second terminal (e.g. Terminal 2). In this case, if a first base station (e.g. BS1) transmits a signal using transmit beam 1 930, it can be identified that the first terminal receiving the signal is located in the interference region. The first base station may identify that the first terminal is located in the interference region using the interference region information. For example, the interference region information may include the presence or absence of the interference depending on the beam pair. If there is no receive beam that interferes with the transmit beam 1 930, the first base station may determine that the first terminal is not located in the interference region. In contrast, if there is a receive beam that interferes with the transmit beam 1 930 or if the number of receive beams that acts as the interference is greater than or equal to the preset number or there is a receive beam greater than or equal to a preset strength that acts as the interference, the first base station may determine that the first terminal is located in the interference region. Accordingly, if the first terminal is located in the interference region and thus receives the interference from the second terminal, the first base station may allocate the fixed resource region 910 to the first terminal.

Further, the second terminal may interfere with the first terminal. Accordingly, a second base station (e.g. BS2) may identify that the second terminal transmitting the signal received by the second terminal through a receive beam 1 940 of the second base station is located in the interference region. Therefore, the second base station may allocate the fixed resource region 920 to the second terminal.

In addition, a third terminal (e.g. Terminal 3) may not be affected by the interference, and it may be identified that the third terminal receiving the signal transmitted through a transmit beam 2 950 of first base station is not located in the interference region. Accordingly, the first base station may allocate a dynamic resource region or a shared resource region (e.g. shared DL/UL resource) to the third terminal.

In this way, allocating the fixed region for the DL or the UL may somewhat reduce the resource allocation flexibility but is very useful for eMBB/URLLC service coexistence and the control channel.

In addition, a URLLC service UE is preferentially allocated to the fixed uplink or downlink resource (e.g. no real-time coordination between base stations is required for a fixed region), and for the eMBB service, the resources of the fixed region are allocated to the terminal located in the interference region using the above-mentioned method and the dynamic resources may be allocated to terminals that are not located in the interference region.

Figure 10A:
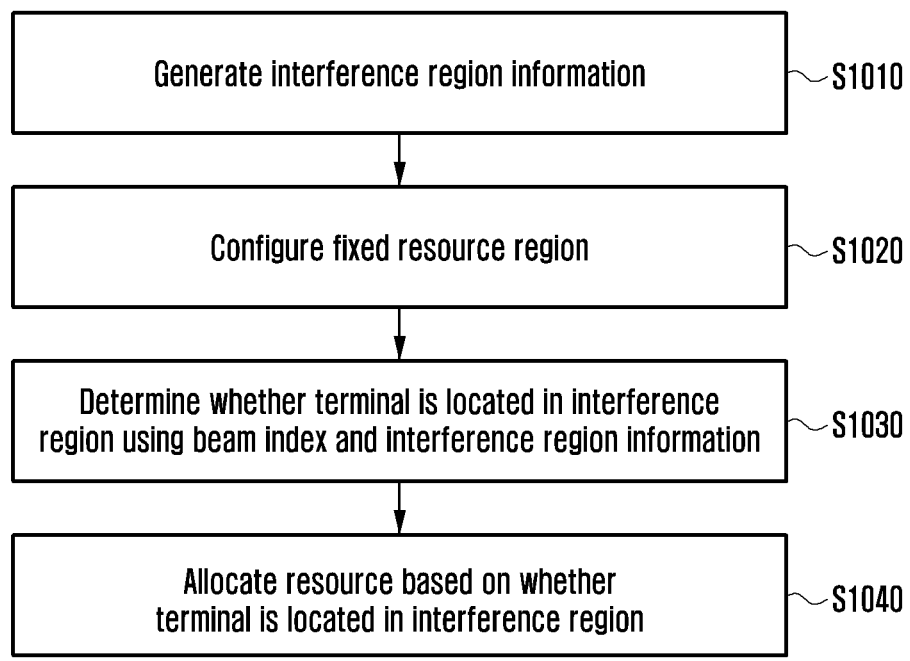
FIG. 10A is a flowchart of a method of managing interference using an interference region information based frame structure according to an embodiment of the present disclosure.

FIG. 10A is a flowchart of a method of managing interference using an interference region information based frame structure according to an embodiment of the present disclosure.

Referring to FIG. 10A, in step S1010, a base station may generate interference region information. In addition, as described above, the base station may receive the interference region information instead of generating the interference region information in the step S1010. The details are the same as those described above with reference to FIG. 4A.

In step 1020, the base station may configure a fixed resource region. The base station may set some resources as the fixed resource regions for the uplink and the downlink in units of a frame, a subframe or slot through the pre-coordination with neighboring base stations.

In step S1030, the base station may determine whether the terminal is located in the interference region using the beam index and the interference region information.

Thereinafter, in step S1040, the base station may allocate resources according to the determination result. For example, if the base station determines that the terminal is located in the interference region, the base station may allocate the resources of the fixed resource region to the terminal. In contrast, if it is determined that the terminal is not located in the interference region, the base station may allocate the resources of the fixed resource region or the resources of the shared resource region to the terminal.

Figure 10B:
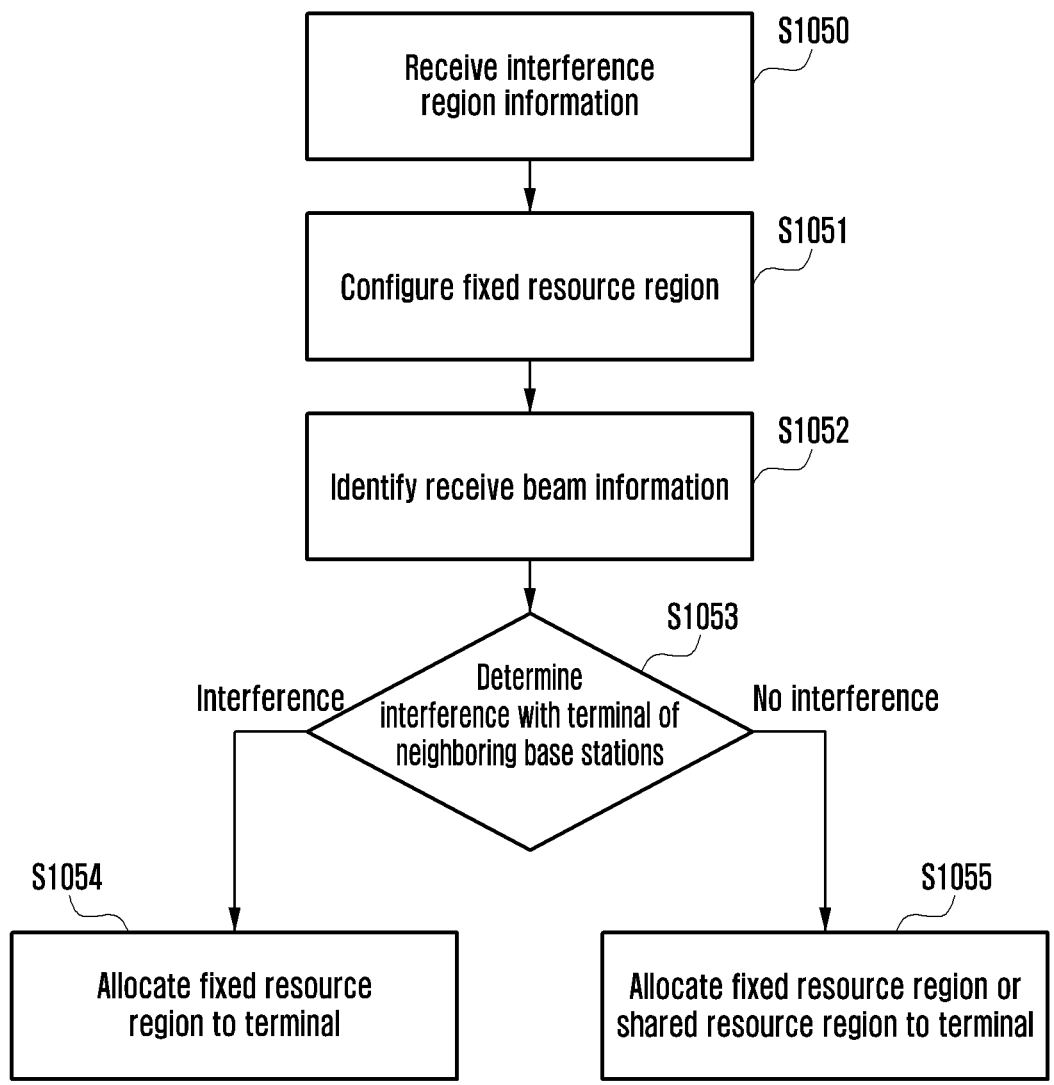
FIG. 10B is a flowchart of a method of a second base station to which an interfering second terminal belongs.

FIG. 10B is a flowchart of a method of a base station (e.g. second base station) to which the interfering terminal (e.g. second terminal) belongs.

Referring to FIG. 10B, in step S1050, the second base station may receive the interference region information. Alternatively, the second base station may generate the interference region information. As described above, the generation of the interference region information is performed by cooperation with neighboring base stations, and the detailed contents will be omitted.

In step S1051, the second base station may configure a fixed resource region in the terminal. The second base station may configure some resources of the frame, the subframe, and the slot as the fixed resource regions for the DL and the UL by the pre-coordination between the base stations.

In step S1052, the second base station may identify the receive beam information. The second base station may identify best receive beam information for receiving the signal that the second terminal transmits.

In step S1053, the second base station may determine interference with the first mobile station based on the receive beam information and the interference region information.

Accordingly, if it is determined that the first terminal suffers from interference of a certain threshold or greater, in step S1054, the second base station allocates the fixed resource region (UL dedicated time resource) to the second terminal, or otherwise in step S1055, the second base station allocates the fixed resource region (UL dedicated time resource) or a shared resource region (UL/DL shared time resource) to the second terminal.

Figure 10C:
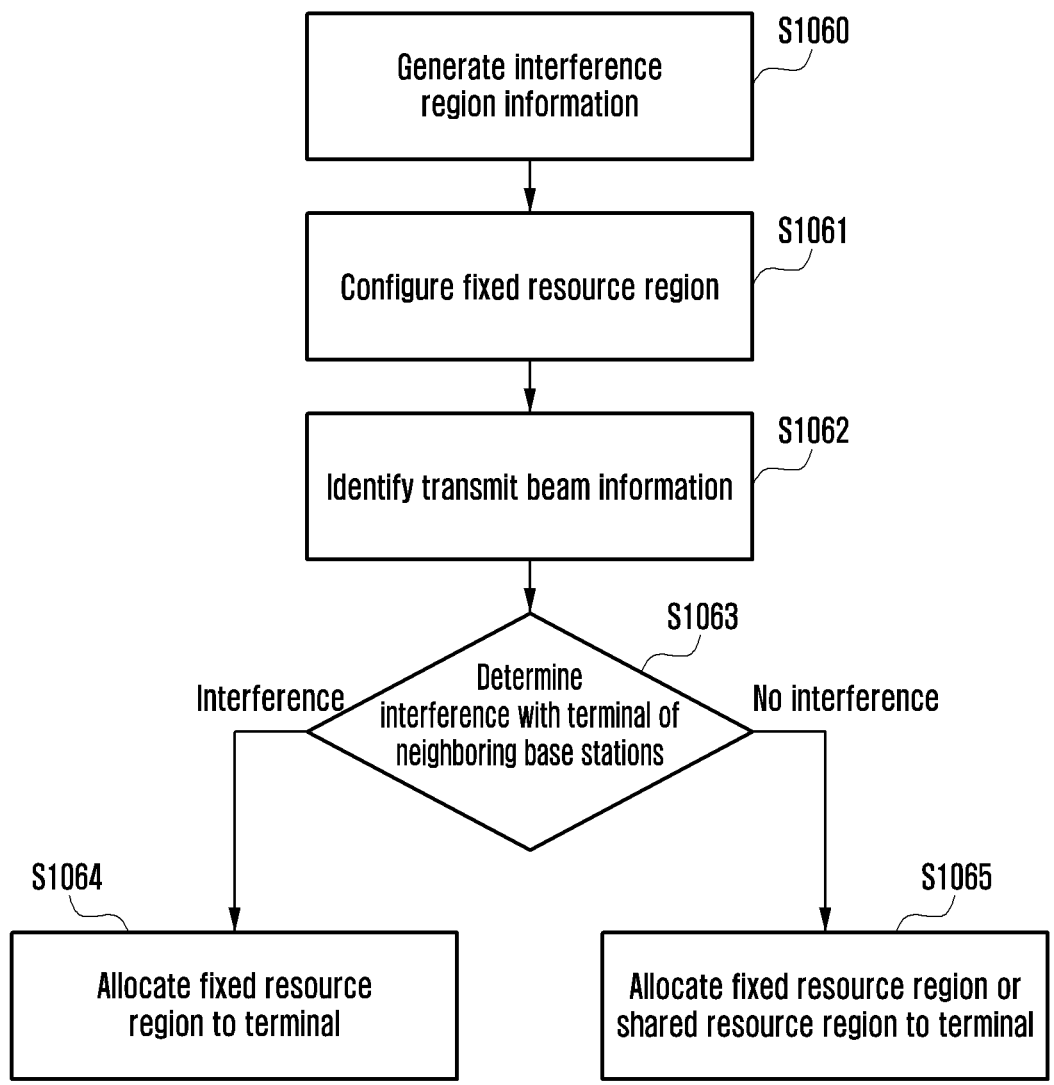
FIG. 10C is a flowchart of a method of a first base station to which an interfered first terminal belongs.

FIG. 10C is a flowchart of a method of a base station (e.g. first base station) to which the interfered terminal (e.g. first terminal) belongs.

Referring to FIG. 10C, in step S1060, the first base station may generate the interference region information. Alternatively, the first base station may receive the interference region information from other base stations. The detailed content is the same as those described above and therefore is omitted below.

In step 1061, the first base station may configure the fixed resource region.

In step S1062, the first base station may identify the transmit beam information. The first base station may obtain best transmit beam index information for transmitting a signal to the first terminal.

In step S1063, the first base station may determine the interference due to the second terminal based on the transmit beam information and the interference region information.

Accordingly, if it is determined that there is interference of a certain threshold or greater due to the second terminal, in step S1064, the first base station allocates the fixed resource region (e.g. DL dedicated time resource) to the first terminal, or otherwise in step S1065, the first base station allocates the fixed resource region (e.g. UL dedicated time resource) or the shared resource region (UL/DL shared time resource) to the first terminal.

In the present disclosure, the fixed time domain and the interference region information for the DL and the UL may be determined by the long-term coordination between the base stations, and the base station may allocate resources in real time.

Figure 11:
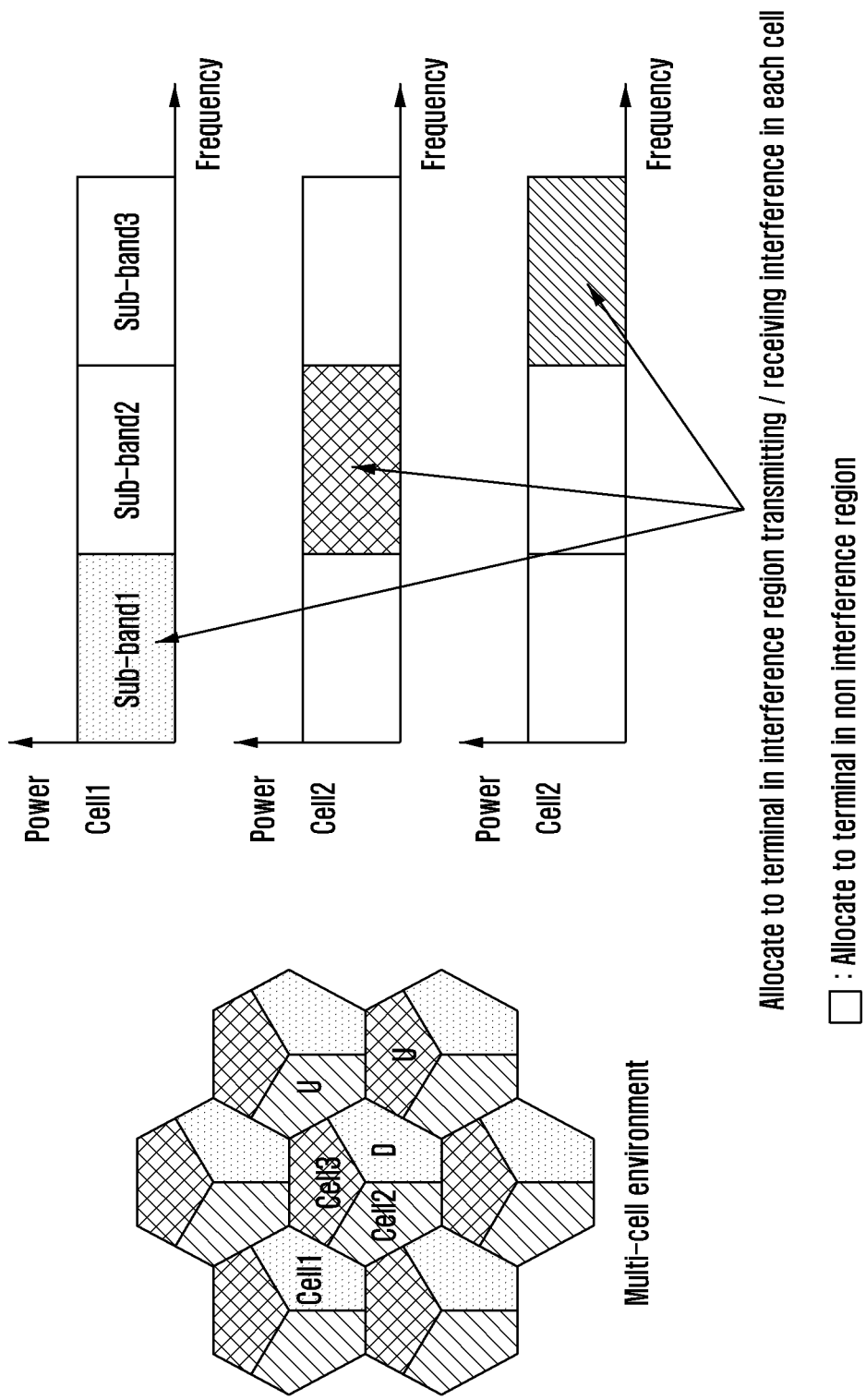
FIG. 11 is an illustration of a method of managing interference using an interference region information based frequency allocation according to an embodiment of the present disclosure.

FIG. 11 is an illustration of a method of managing interference using an interference region information based frequency allocation according to an embodiment of the present disclosure.

If the beam index at which the terminal interferes with neighboring terminals (based on the receive beam index (e.g. UL beam index) of the base station) or receives the interference from neighboring terminals (based on the transmit beam index (e.g. DL beam index) of the base station) is determined as the best beam index, the base station uses a certain sub-frequency band (e.g. sub-band 1 in the case of the cell 1) to transmit/receive a signal to/from the terminal. In this case, there is no need to transmit real-time UE-to-UE beam index information or frequency information for the UE-to-UE interference control.

On the other hand, if the beam index that does not cause the interference is determined as the best beam index, the base station transmits and receives a signal between the terminals using the remaining sub-frequency bands (e.g. sub-bands 2 and 3 in the case of the cell 1). In this case, there is no need to transmit real-time BS-to-BS beam index information or frequency information for the UE-to-UE interference control.

Referring to FIG. 11, when using the transmit/receive beam index by which cell 1 interferes with cell 2 and/or the cell 3 or receives the interference from the cell 2 and/or the cell 3 in the sub-bands 2 and 3, the cell 1 transmits the beam index and the use frequency information to neighboring base stations. The cell 2 and the cell 3 which receive this information may select and determine beam indexes for each sub-band based on the generated or shared interference region information.

Alternatively, the transmit power may be adjusted in consideration of the interference strength generated when the corresponding beam index is used in cell 1 and then transmitted. In this way, when, like the sub-band 2 and the sub-band 3, the cell 1 uses the sub-frequency band preferentially allocated to other cells, cell 1 is used in coordination with a neighboring base station or transmits data using the corresponding resource by a power control.

From the viewpoint of a vertical service, a service requiring low latency like URLLC is preferentially allocated to a sub-frequency band that is preferentially allocated to each cell, and a service relatively less sensitive to latency like eMBB may be allocated to the corresponding resource if there is no URLLC packet.

Figure 12A:
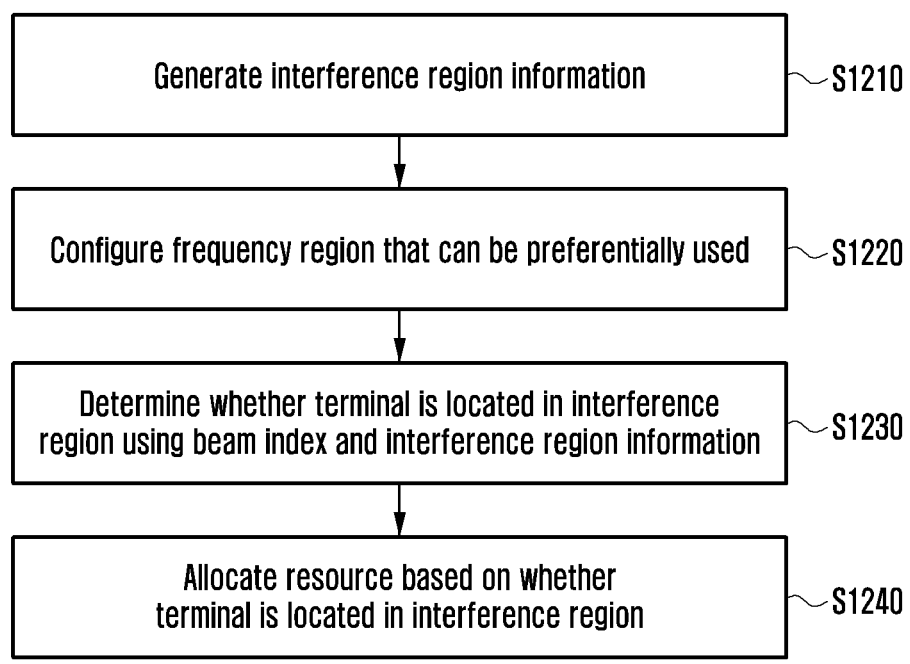
FIG. 12A is a flowchart of a method of managing interference using an interference region information based frequency allocation according to an embodiment of the present disclosure.

FIG. 12A is a flowchart of a method of managing interference using an interference region information based frequency allocation according to an embodiment of the present disclosure.

Referring to FIG. 12A, in step S1210, the base station may generate the interference region information. In addition, as described above, the base station may receive the interference region information instead of generating the interference region information in step S1210.

In step S1220, the base station may set a frequency domain that can be preferentially used in a certain cell. The base station may set each frequency domain that can be preferentially used for each cell through pre-coordination with neighboring base stations.

In step S1230, the base station may determine whether the terminal is located in the interference region using the beam index and the interference region information.

Thereinafter, in step S1240, the base station may allocate resources according to the determination result. For example, if the base station determines that the terminal is located in the interference region, the base station may allocate the resource of the frequency domain, which can be preferentially used in the corresponding cell, to the terminal. In contrast, if the base station determines that the terminal is not located in the interference region, the base station may allocate to the terminal the resource of the frequency domain that can be preferentially used in the corresponding cell or the resource of the frequency domain that can be preferentially used in other cells.

Figure 12B:
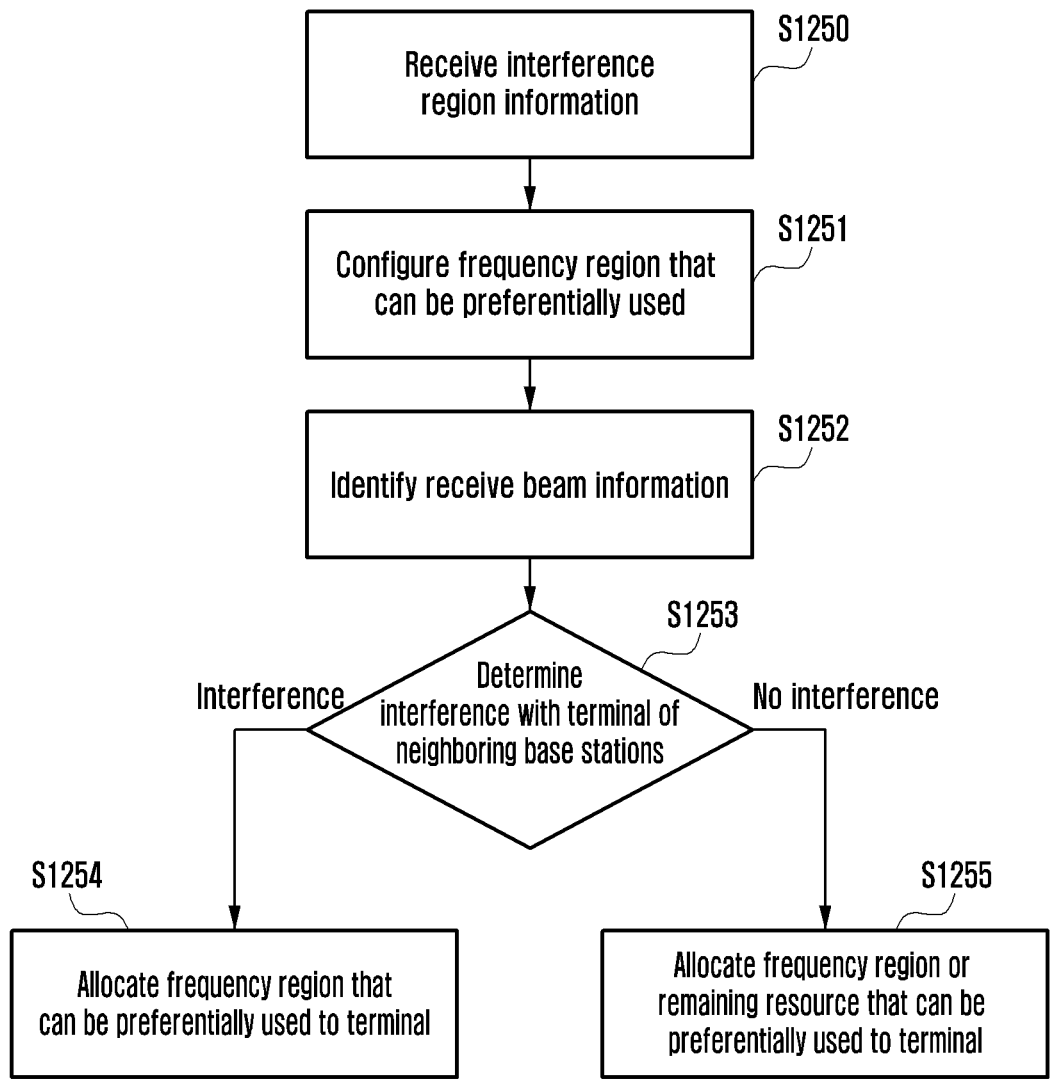
FIG. 12B is a flowchart of a method of a second base station to which an interfering second terminal belongs.

FIG. 12B is a flowchart of a method of a base station (e.g. second base station) to which the interfering terminal (e.g. second terminal) belongs.

Referring to FIG. 12B, in step S1250, the second base station may receive the interference region information. Alternatively, the second base station may generate the interference region information. As described above, the generation of the interference region information is performed by cooperation with neighboring base stations, and the detailed contents are omitted below.

In step S1251, the second base station may set a frequency domain that can be preferentially used in the cell of the second base station. The second base station sets an orthogonal frequency domain that can be preferentially used in a specific cell by the pre-coordination between base stations.

In step S1252, the second base station may identify the receive beam information. The second base station may identify best receive beam information for receiving the signal that the second terminal transmits.

In step S1253, the second base station may determine interference with the first mobile station based on the receive beam information and the interference region information.

Accordingly, if it is determined that the first terminal suffers from an interference of a certain threshold or greater, in step S1254, the second base station may allocate an orthogonal frequency resource, which can be preferentially used, to the second terminal, or otherwise, in step S1255, the second base station may allocate a non-orthogonal resource to the second terminal. In addition, if the uplink signal of the second terminal has an influence of interference of a certain threshold or greater on the first terminal, the second base station may allocate the first available orthogonal frequency resource to the second terminal according to the resource allocation situation.

Figure 12C:
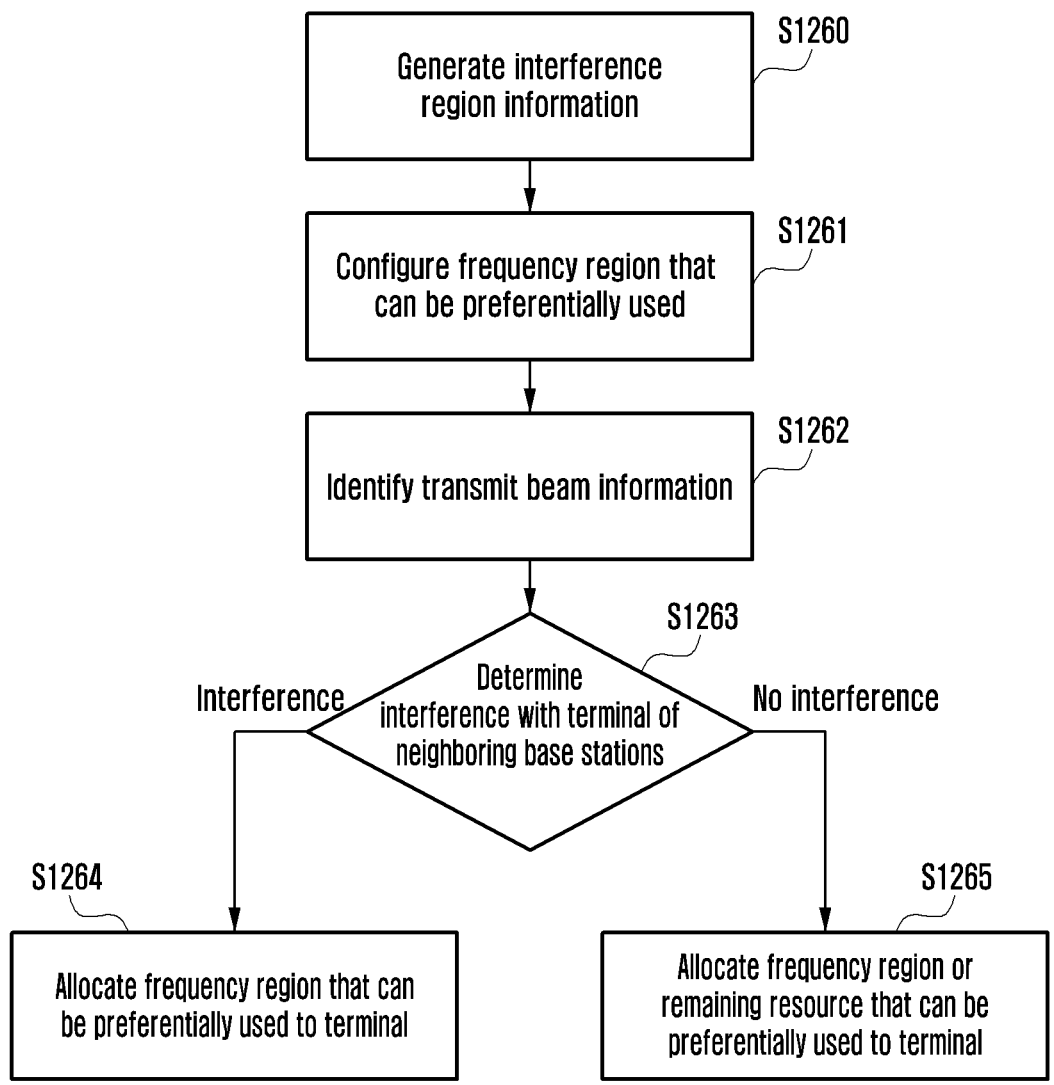
FIG. 12C is a flowchart of a method of a first base station to which an interfered first terminal belongs.

FIG. 12C is a flowchart of a method of a base station (e.g. first base station) to which an interfered terminal (e.g. first terminal) belongs.

Referring to FIG. 12C, in step S1260, the first base station may generate interference region information. Alternatively, the first base station may receive the interference region information from other base stations. The detailed contents are the same as those described above and therefore are omitted below.

In step S1261, the first base station may set a frequency domain that may be preferentially used in the cell of the second base station. The first base station sets an orthogonal frequency domain that may be preferentially used in a certain cell by the pre-coordination between base stations.

In step S1262, the first base station may identify the transmit beam information. The first base station may obtain best transmit beam index information for transmitting a signal to the first terminal.

In step S1263, the first base station may determine the interference due to the second terminal based on the transmit beam information and the interference region information.

Accordingly, if it is determined that there is the interference of a certain threshold or higher due to the second terminal, ins step S1264, the first base station allocates the orthogonal frequency resource, which can be preferentially used, to the first terminal, or otherwise, in step S1265, the first base station allocates the non-orthogonal resource to the first terminal. In addition, if the uplink signal of the second terminal has an influence of interference of a specific threshold or greater on the first terminal, the first base station may allocate the first available orthogonal frequency resource to the first terminal according to the resource allocation situation.

Figure 13A:
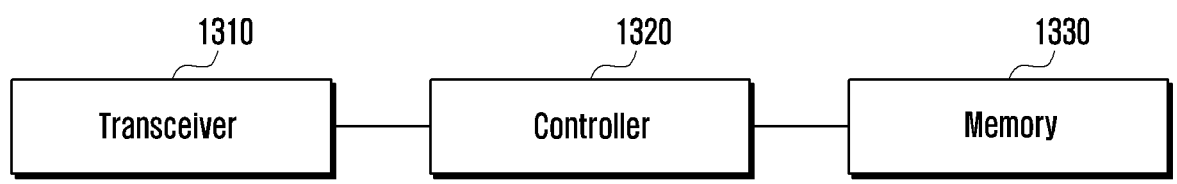
FIG. 13A is a block diagram of a base station according to an embodiment of the present disclosure.

FIG. 13A is a block diagram of a base station according to an embodiment of the present disclosure.

Referring to FIG. 13, the base station may include a transceiver 1310, a controller 1320, and a memory 1330. For example, the controller 1320 may be a circuit, an ASIC, or at least one processor. The transceiver 1310 may transmit or receive signals. The transceiver 1310 may transmit, for example, the interference region information to other base stations. Further, the transceiver 1310 may transmit a message triggering the interference measurement to the terminal.

The controller 1320 may control the overall operation according to an embodiment of the present disclosure. The detailed configuration of the controller 1320 is described below with reference to FIG. 13B.

Figure 13B:
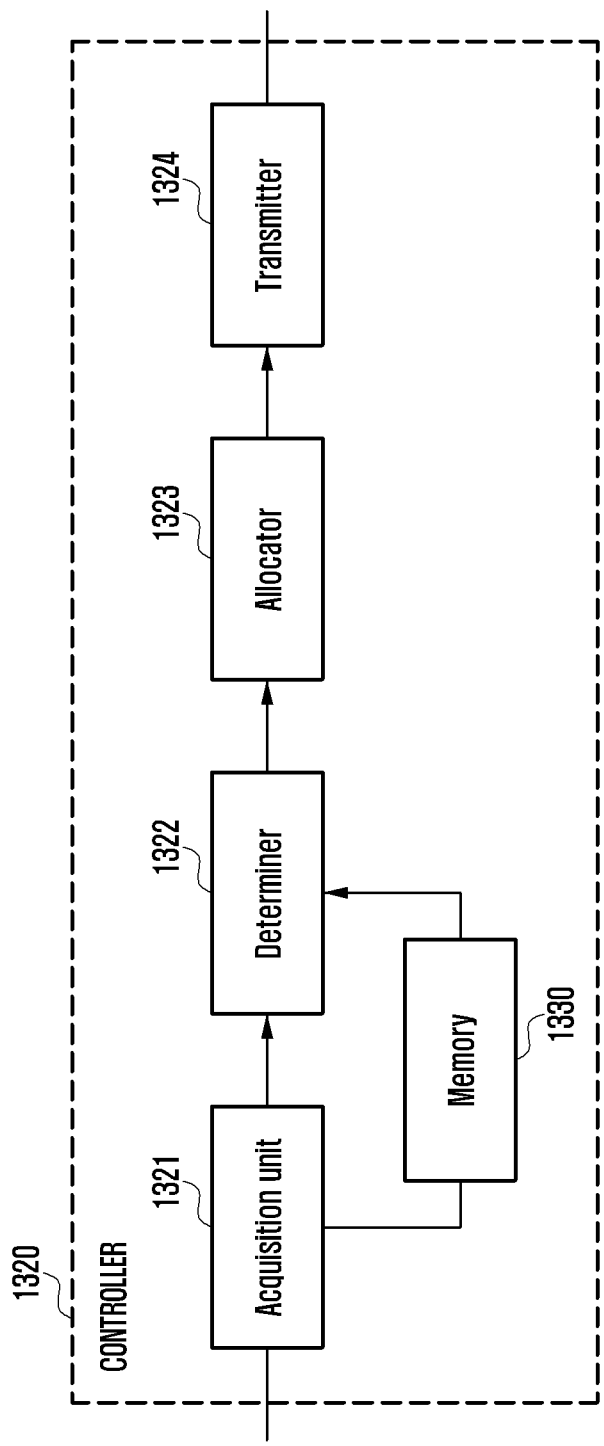
FIG. 13B is a block diagram of a controller of a base station according to an embodiment of the present disclosure.

FIG. 13B is a block diagram of a controller 1320 of a base station according to an embodiment of the present disclosure.

Referring to FIG. 13B, the controller 1320 may include an acquisition unit 1321, a determiner 1322, an allocator 1323, a transmitter 1324, and a memory 1330. However, the transmitter 1324 may be configured to be the same as the transceiver 1310 of FIG. 13A, and the transmitter 1324 and the memory 1330 may be separately configured as illustrated in FIG. 13A without being included in the controller 1320.

The acquisition unit 1321 serves to receive the best transmit/receive beam index information and may acquire a plurality of best-M transmit/receive beam index information.

The memory 1330 may store the interference region information.

The determiner 1322 determines the interference based on the receive/transmit beam index information and the interference region information. The determiner of the base station to which the interfering terminal belongs identifies the best receive beam index information of the base station for receiving the signal that the interfering terminal transmits and determines the interference with terminals of neighboring base stations based on the receive beam information and the interference region information. The base station to which the interfered terminal belongs acquires the best transmit beam index information of the base station for transmitting a signal to the interfered terminal and determines the interference due to terminals of neighboring base stations based on the transmit beam information and the interference region information.

The allocator 1323 may allocate resources to the terminal in consideration of the interference. If the terminal receives the interference or may interfere with other terminals, the allocator 1323 may allocate resources by referring to the resource allocation information of the neighboring base stations. Alternatively, the allocator 1323 allocates the fixed time domain resources for the DL and the UL in units of the frame/subframe/slot to the terminal, or allocates to the terminal the orthogonal frequency resource that can be preferentially used in each cell.

The transmitter 1324 transmits the UE-to-UE interference region table information to the neighboring base stations or transmits data through the allocated resources. However, as described above, the transmitter 1324 may be configured separately from the controller without being included in the controller 1320, like the transceiver 1310 of FIG. 13A.

Figure 14:
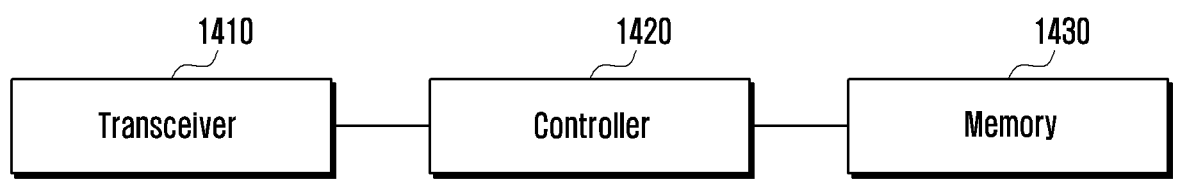
FIG. 14 is a block diagram of a terminal according to an embodiment of the present disclosure.

FIG. 14 is a block diagram of a terminal according to an embodiment of the present disclosure.

Referring to FIG. 14, the terminal may include a transceiver 1410, a controller 1420, and a memory 1430. For example, the controller 1420 may be a circuit, an ASIC, or at least one processor.

The transceiver 1410 may transmit and receive a signal. For example, the transceiver 1410 may receive the interference measurement triggering information from the base station. In addition, the transceiver 1410 feedbacks to the base station the UE-to-UE interference strength or whether there is the UE-to-UE interference.

The controller 1420 may control the overall operation according to an embodiment of the present disclosure. For example, the controller 1420 may measure the interference strength.

The memory 1430 may store at least one of the information transmitted/received through the transceiver 1410 and the information generated through the controller 1420. For example, the memory 1430 may store the UE-to-UE interference strength or whether there is the UE-to-UE interference.

In addition, in a 5G communication system, as communication is performed through a high frequency band, the linearity of a signal is enhanced. Accordingly, a terminal and a base station may perform communication using beamforming. To this end, the terminal and the base station determine the best beam pair to perform communication, and the process of determining the best beam pair may be referred to as beam management.

In addition, even when downlink beam management for determining the best beam pair between the transmit beam of the base station for transmitting the downlink signal and the receive beam of the terminal is performed, if there is no beam correspondence, separate uplink beam management is required (e.g. there is a need to determine the receive beam of the base station and the transmit beam of the terminal). Therefore, a method and an apparatus for managing an uplink beam are described below.

The beam correspondence in the present disclosure may be defined as follows.

If the best beam in the DL (or UL) and the best beam in the UL (or DL) are the same (e.g. if the beam directions are the same or the beam index is the same), then it can be defined that the beam correspondence is held or present. Alternatively, a certain entity may be said to have beam correspondence validity. Therefore, if the beam correspondence is held, a TRP transmit (Tx) beam (or UE receive (Rx) beam) acquired by the DL beam management may be used as the TRP Rx beam (or UE Tx beam) for UL transmission.

The UL beam management type may be classified into four types according to whether the beam correspondence is held or present in the TRP and the UE.

FIG. 15 is a chart of an UL beam management type depending on beam correspondence capability according to an embodiment of the present disclosure.

Referring to FIG. 15, in case of type 1 in which the beam correspondence is held in both the TRP and the UE, the beam information acquired by the DL beam management may be used as the UL transmit/receive beam, and the UL beam management need not be additionally performed.

Type 2 is a case where the beam correspondence is not held in both of the TRP and the UE. In this case, the terminal must find both the transmit beam required for the UL transmission and the receive beam of the TRP. Therefore, for the UL beam management, both of the TRP and the UE must perform a beam sweep.

Type 3 is a case where the beam correspondence is held only in the UE. In this case, the UE may use the downlink receive beam as the uplink transmit beam and the TRP must perform the beam sweep to find the uplink receive beam.

Type 4 is a case where the beam correspondence is held only in the TRP. In this case, the TRP may use the downlink transmit beam as the uplink receive beam, and the UE must perform the beam sweep to find the uplink transmit beam. It is illustrated in FIG. 2B whether the beam is acquired by the beam sweep in the TRP and the UE according to each beam management type.

Figure 16:
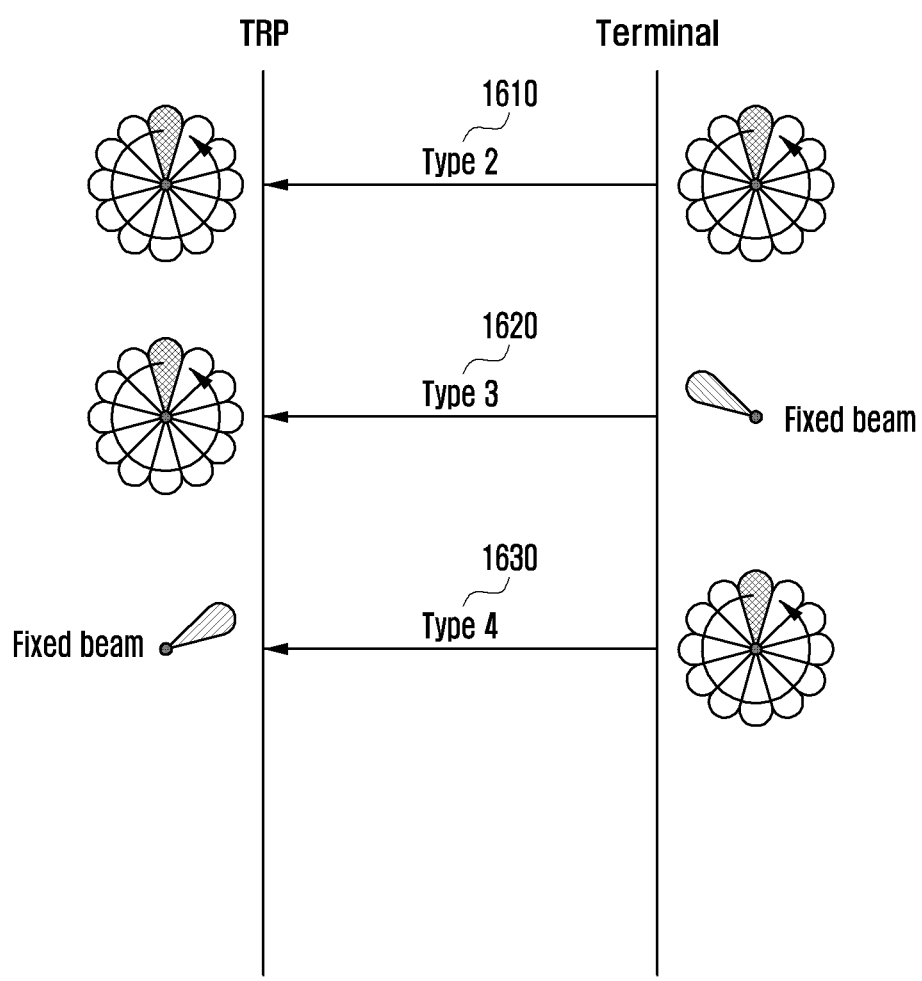
FIG. 16 is an illustration of a beam search for beam selection depending on a beam management type according to an embodiment of the present disclosure.

FIG. 16 is an illustration of a beam search for beam selection depending on a beam management type according to an embodiment of the present disclosure.

Referring to FIG. 16, in the case of type 2 1610, there is no beam correspondence between the terminal and the TRP. Therefore, the terminal must find both the transmit beam and the TRP receive beam required for the UL transmission, and both of the terminal and the TRP may perform the beam sweep to find the best beam pair. In the case of type 3 1620, there is the beam correspondence in the terminal and there is no beam correspondence in the TRP. Accordingly, the terminal may use the DL receive beam as the uplink transmit beam, and the TRP may find the best uplink receive beam by the beam sweep.

In the case of type 4 1630, there is the beam correspondence in the base station and there is no beam correspondence in the terminal. Accordingly, the base station may use the downlink transmit beam as the uplink receive beam, and the terminal may find the best uplink transmit beam by the beam sweep.

In addition, the subject of the UL beam management, which determines whether to perform the UL beam management, UL beam management type, and the like and performs the triggering, may be the TRP or the terminal. Hereinafter, certain operations according to the subject of the beam management are described below.

Figure 17:
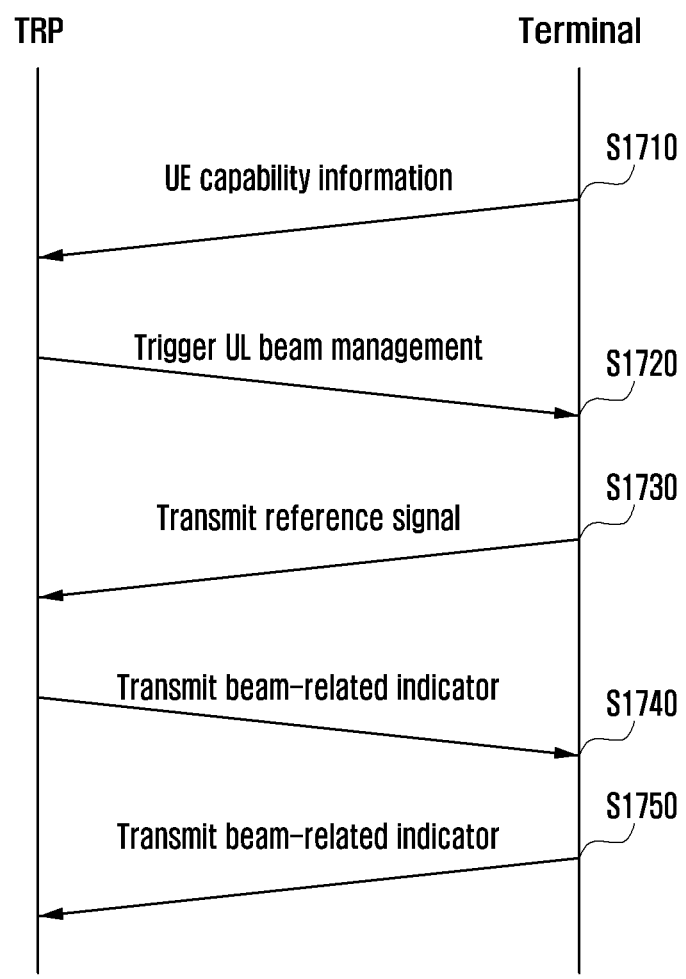
FIG. 17 is a flow diagram of a case where a TRP is a subject of uplink beam management according to an embodiment of the present disclosure.

FIG. 17 is a flow diagram illustrating a case where a TRP is a subject of uplink beam management according to an embodiment of the present disclosure.

Referring to FIG. 17, in step S1710, the terminal may transmit the UE capability information to the TRP. If the TRP is the subject of the uplink beam management, to determine whether to perform the uplink beam management, the uplink management type, and the like and perform the triggering, the TRP needs to know whether the beam correspondence of the terminal is held.

Therefore, the information on the beam correspondence capability indicating whether the beam correspondence of the terminal is held must be indicated to the TRP. Accordingly, the terminal may transmit information indicating whether the beam correspondence is held, which is included in the UE capability information, to the base station. However, as a method for transmitting an indication for the beam correspondence capability, in addition to the method of including information on beam correspondence capability in UE capability information, a method for transmitting information on beam correspondence capability included in uplink control information (UCI) information to a base station and a method for transmitting information on beam correspondence capability included in UCI information transmitted through PUCCH to a base station may be used. Accordingly, the terminal may inform the base station of whether the beam correspondence is held by using at least one of the above-described methods.

Thereafter, in step S1720, the TRP may trigger the uplink beam management. In this case, the TRP may be triggered via the downlink control information (DCI) or via the medium access control control element (MAC CE).

In addition, the TRP may inform the terminal of the uplink beam management type information in order to inform the beam sweep in the TRP or the terminal. Accordingly, base station must transmit the information on any one of the types 1 to 4 through the uplink beam management trigger, and the information may consist of 2 bits.

In step S1730, the terminal may transmit a reference signal. The terminal may transmit the reference signal for the uplink beam management to the TRP, and the TRP may select the best beam pair by measuring the reference signal.

In addition, according to the uplink beam management type, the terminal may transmit the reference signal by the same beam as the downlink receive beam or transmit the reference signal by sweeping the beam and the base station may measure the reference signal or sweep the beam by the downlink transmit beam and select the best beam pair by measuring the reference signal.

In addition, an uplink reference signal (UL RS) such as a sounding reference signal (SRS) and a demodulation reference signal (DM-RS) may be used for the UL beam management. In this case, the TRP needs to inform the UE of whether the reference signal to be transmitted by the terminal is for the existing SRS, the DM-RS or the UL beam management. For example, since the DM-RS may not be used at one time (within one subframe/slot) for beam search and channel estimation purposes, the indication for whether the DM-RS is used for the beam search or the channel estimation in the specific subframe/slot is required.

Accordingly, the base station may inform the usage of the reference signal through at least one of the DCI and the MAC CE.

In addition, in order to efficiently use the resources used for the UL beam management, it is necessary to bundle a plurality of UEs and simultaneously perform the UL beam management. For this purpose, the UEs need to share the UL RS resources in the UL beam management, and the base station must identify from which terminal the received reference signal is received. Therefore, at least one of the following methods may be used to identify from which terminal the reference signal transmitted from the resources shared by the terminals is transmitted.

Alternative 1: UE identification method based on code division multiplexing (CDM).

Alternative 2: UE identification method based on frequency division multiplexing (FDM).

Alternative 3: UE identification method based on time division multiplexing (TDM).

A method of identifying terminals based on CDM is a method in which terminals performing UL beam management use a UL RS having different sequences or codes. For this purpose, the TRP may allocate a sequence identifier (ID) that allows UEs to use different sequences.

A method for identifying terminals using FDM or TDM is a method for identifying uplink reference signal resources of UEs and identifying terminals using resources to which reference signals are transmitted. For this purpose, the TRP may transmit information for setting locations of time or frequency resources for each UE to the UE. The TRP can inform the locations of the time or frequency resources in advance by the radio resource control (RRC) signaling, or may dynamically inform the locations of the time or frequency resources the resource position by using the DCI, the MAC CE, or the like.

Thereafter, in step S1740, the TRP may transmit the beam-related indicator to the terminal. For example, in the case of the type 2 and the type 4 of the uplink beam management types, a process of finding the best transmit beam of the terminal is included. Therefore, the TRP determines the uplink transmit beam (UL Tx beam) of the terminal and then informs the UE of the UL Tx beam, which may be referred to as the beam-related indicator (or a beam-related indicator for the terminal). In this case, the beam-related indicator for the terminal may include at least one of the following.

Alternative 1: beam index.

Alternative 2: beam index+beam reference signal received power (RSRP).

Alternative 3: beam index+channel state information (CSI) (CQI/PMI/RI).

That is, the TRP may inform only the index of the terminal transmit beam or inform the power information (e.g. RS received power (RSRP)) when the reference signal is received by the corresponding beam, together with the beam index.

Alternatively, the TRP may inform the channel state information together with the beam index. At this time, the channel state information may include at least one of channel quality indicator (CQI), pre-coding matrix indicator (PMI), and rank indicator (RI).

In addition, the TRP may transmit information on N beams to the UE, where N may be one or more. As the method for transmitting a beam-related indication for a UE, one or more of the following may be used.

Alternative 1: Transmission method through DCI.

Alternative 2: Transmission method through MAC CE.

Alternative 3: Transmission method through physical downlink shared channel (PDSCH).

In step S1750, the terminal may transmit the beam-related indicator to the TRP. For example, if the number of beams included in the beam-related indicator received by the terminal is greater than 1, the terminal must select the beam to be used for the uplink transmission. The terminal needs the indication to inform the TRP of the selected beam information, which may be referred to as the beam-related indicator (or beam-related indicator for the TRP). The beam-related indicator for the terminal may include at least one of the following.

Alternative 1: beam index.

Alternative 2: beam index+beam RSRP.

That is, the terminal may transmit the beam-related indicator including the beam index or the beam-related indicator including the beam index and the RSRP to the base station. In this case, the terminal may transmit the beam-related information for the TRP which is included in the UCI transmitted through the physical uplink shared channel (PUSCH) or included in the UCI transmitted through the physical uplink control channel (PUCCH).

In addition, the terms such as the first beam-related indicator and the second beam-related indicator may be used to identify the beam-related indicator for the terminal from the beam-related indicator for the base station.

Figure 18:
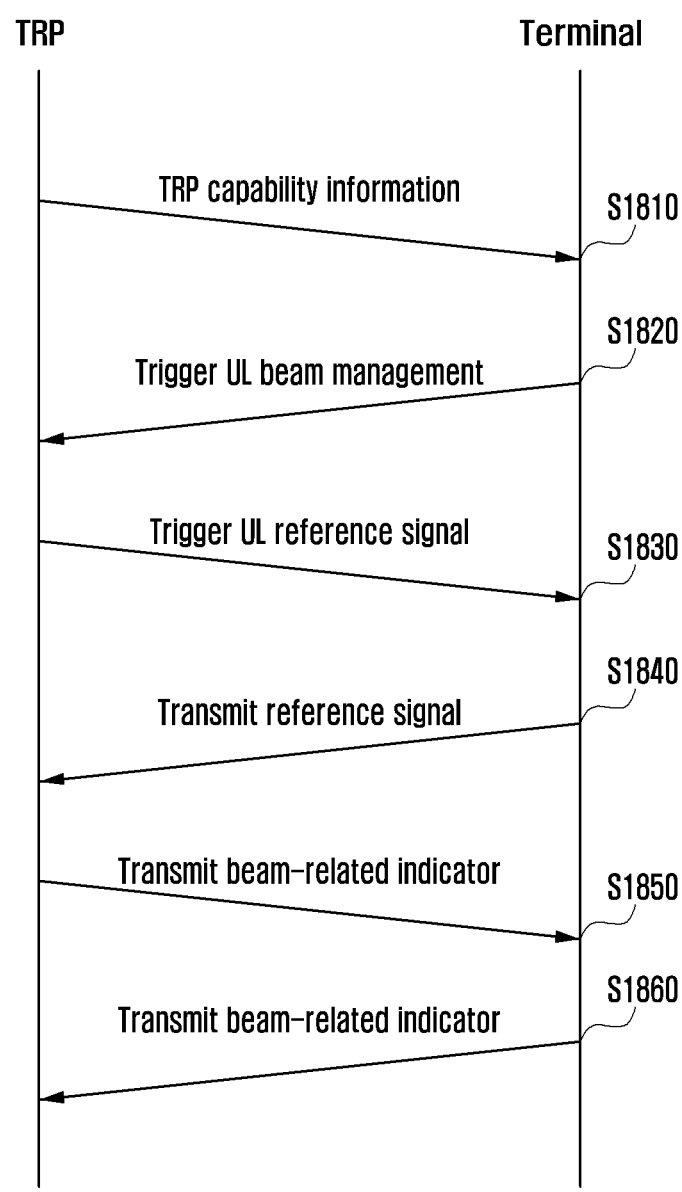
FIG. 18 is a flow diagram of a case where a terminal is a subject of uplink beam management according to an embodiment of the present disclosure.

FIG. 18 is a flow diagram of a method where a terminal is a subject of uplink beam management according to an embodiment of the present disclosure.

Referring to FIG. 18, in step S1810, the TRP may transmit the TRP capability information to the terminal. If the terminal is the subject of the uplink beam management, the terminal must determine whether to perform the uplink beam management, the uplink management type, and the like and know the beam correspondence information of the TRP to trigger the uplink beam management. Therefore, the TRP needs to transmit to the UE the beam correspondence capability indicating whether the beam correspondence is held. For this purpose, one or more of the following methods may be used.

Alternative 1: Transmission method through system information (master information block (MIB) or system information block (SIB)).

Alternative 2: Transmission method through RRC signaling (or higher layer signaling).

Alternative 3: Transmission method through DCI.

Alternative 4: Transmission method through MAC CE.

In step S1820, the terminal may trigger the uplink beam management. In this case, the terminal can transmit a message triggering the uplink beam management to the TRP by the following method.

Alternative 1: Transmission through UCI of PUSCH.

Alternative 2: Transmission through UCI of PUSCH.

In addition, the terminal may inform the TRP of the uplink beam management type information in order to inform the beam sweep in the TRP or the terminal. Accordingly, the terminal must transmit the information on any one of the types 1 to 4 through the trigger of the uplink beam management, and the information may consist of 2 bits.

In step S1830, the TRP may trigger the uplink reference signal for the uplink beam selection. Accordingly, in step S1840, the terminal may transmit the reference signal to the TRP. However, the present disclosure is not limited thereto, and the process of triggering the reference signal of the base station may be omitted. That is, the terminal triggers the uplink beam management and the terminal may transmit the reference signal to the TRP without triggering the reference signal.

Therefore, the TRP may select the best beam pair by measuring the reference signal. The certain contents of a method of transmitting an indicator for informing a purpose of a reference signal, a method of identifying a terminal by a TRP using a reference signal transmitted through a shared uplink reference signal resource, and the like are the same as those described with reference to FIG. 17, and therefore are not described below.

In step S1850, the TRP may transmit the beam-related indicator to the terminal, and in step S1860, the terminal may transmit the beam-related indicator to the TRP. Contents of steps S1840 to S1860 are the same as those described in steps S1730 to S1750 of FIG. 17, and are not described below.

Figure 19:
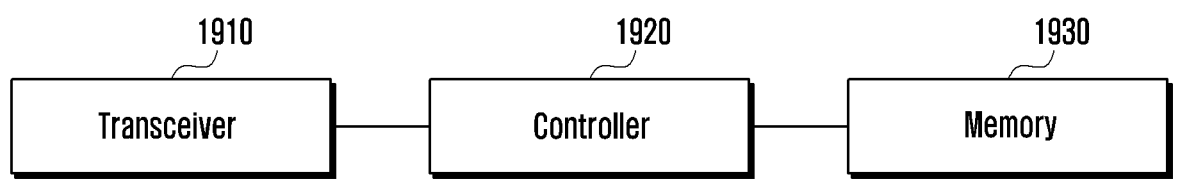
FIG. 19 is a block diagram of a TRP according to an embodiment of the present disclosure.

FIG. 19 is a block diagram of a TRP according to an embodiment of the present disclosure.

Referring to FIG. 19, a base station may include a transceiver 1910, a controller 1920, and a memory 1930. For example, the controller may be a circuit, an ASIC, or at least one processor. The transceiver 1910 may transmit or receive signals. The transceiver 1910 may transmit, for example, a message triggering the uplink beam management or transmit the beam-related indicator.

The controller 1920 may control the overall operation according to an embodiment of the present disclosure. For example, the controller 1920 may determine whether to trigger the uplink beam management, determine the best beam pair by measuring the reference signal of the terminal, and transmit the beam-related indicator to the terminal.

The memory 1930 may store at least one of the information transmitted or received through the transceiver 1910 and the information generated through the controller 1920.

Figure 20:
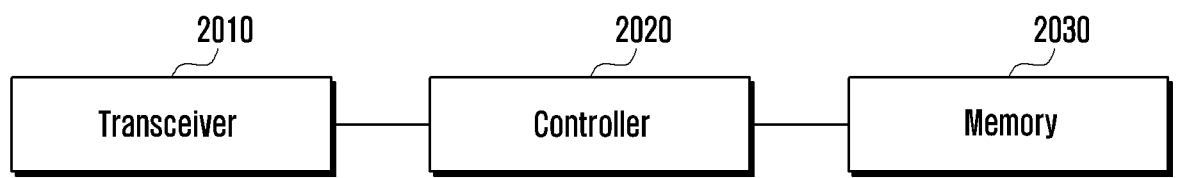
FIG. 20 is a block diagram of a terminal according to an embodiment of the present disclosure.

FIG. 20 is a block diagram of a terminal according to an embodiment of the present disclosure.

Referring to FIG. 20, the terminal may include a transceiver 2010, a controller 2020, and a memory 2030. For example, the controller may be a circuit, an ASIC, or at least one processor. The transceiver 2010 may transmit or receive signals. The transceiver 2010 may transmit, for example, the message triggering the uplink beam management, transmit the reference signal, or transmit the beam-related indicator.

The controller 2020 may control the overall operation according to an embodiment of the present disclosure. For example, the controller 2020 may determine whether to trigger the uplink beam management and trigger the uplink beam management to the base station.

The memory 2030 may store at least one of the information transmitted/received through the transceiver 2010 and the information generated through the controller 2020.

Despite various advantages, the OFDM technology has a high peak to average power ratio (PAPR) and therefore consumes a considerable amount of power. Therefore, the LTE system adopts single carrier-frequency division multiple access (SC-FDMA) with low PAPR characteristics as the uplink communication method. In contrast, in a system using a high center frequency (e.g. super high frequency) (e.g., center frequency fc=30 GHz), phase distortion occurs due to phase noise. In an OFDM-based wireless communication system, to estimate phase error, a common phase error (CPE) that commonly affects all OFDM subcarriers is estimated and compensated using the reference signal in a frequency domain and a phase error is estimated and compensated in a symbol unit using a cyclic prefix (CP) in a time domain, such that the effect of the inter-carrier interference (ICI) can be reduced.

However, if the phase error is greatly changed within the symbol, the effect of the inter-carrier interference cannot be reduced even if the phase error is compensated using the cyclic prefix in the time domain. In particular, in the communication system using the very high frequency, the phase error greatly occurs due to characteristics of a radio frequency integrated circuit (RFIC), and therefore the performance degradation due to the inter-carrier interference cannot be prevented only by the phase error estimation in the symbol unit.

Figure 21:
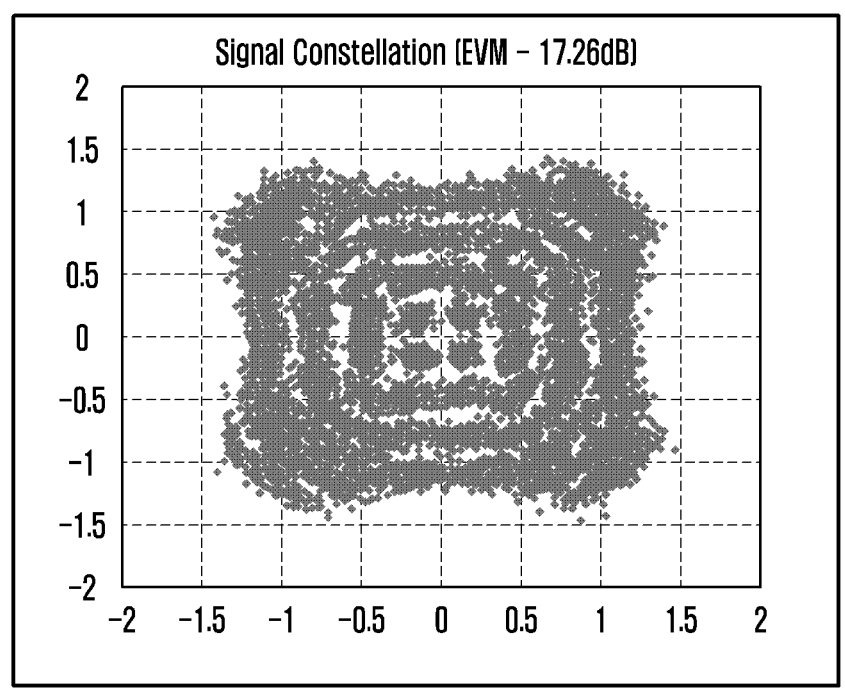
FIG. 21 is an illustration of an effect of phase noise.

FIG. 21 is an illustration of an effect of phase noise.

Referring to FIG. 21, a constellation diagram in the case of 64QAM, in which the constellation may be distorted due to the phase noise, is illustrated. For example, the phase rotation of the constellation and the distortion of each constellation due to the ICI may occur due to the CPE. There is a need for a method for relieving interference due to the phase noise.

Figure 22:
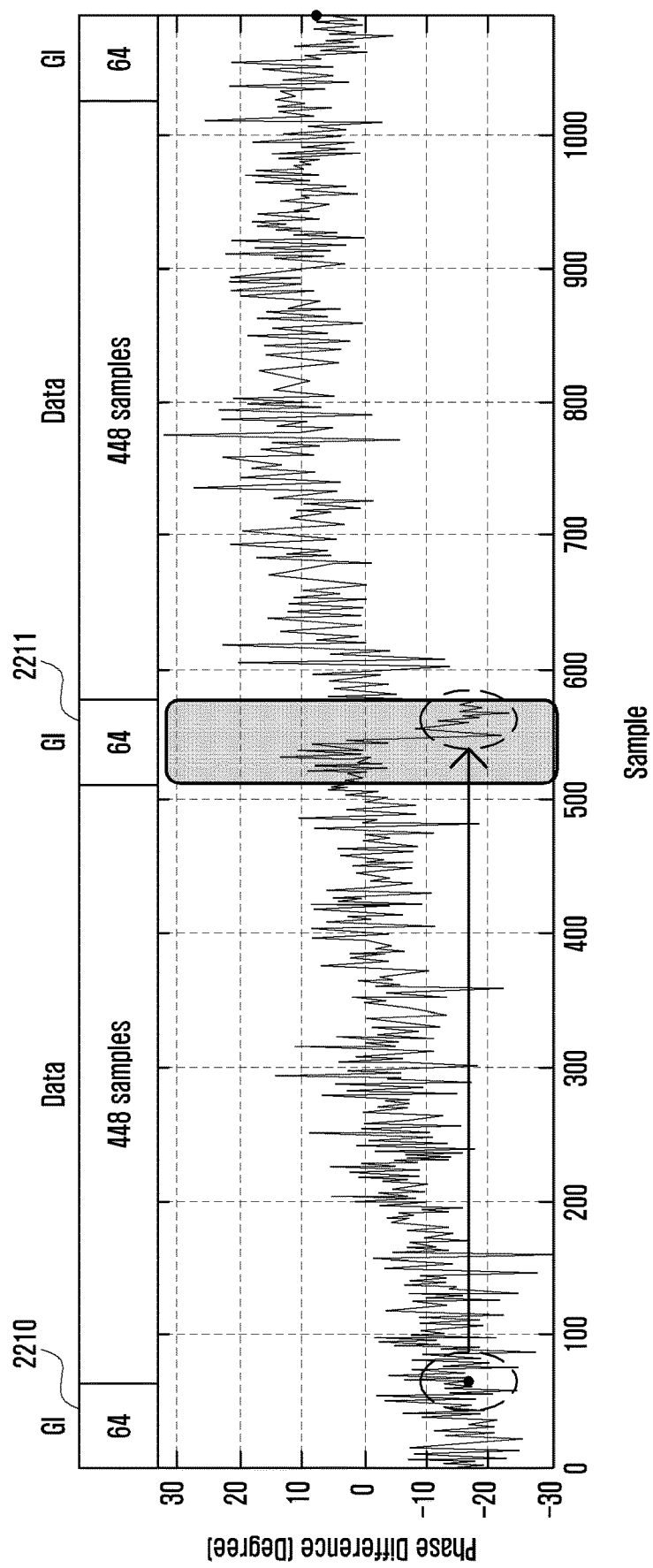
FIG. 22 is a chart of a reference signal (RS) for estimating phase noise.

FIG. 22 is a chart of an RS for estimating phase noise.

Referring to FIG. 22, RSs 2210 and 2211 are allocated at regular intervals in the time domain. Therefore, the phase noise can be estimated and compensated using the phase difference between the RSs spaced apart from each other at the regular intervals. As described above, although the RSs having the length in the symbol unit can estimate only the CPE, the effect of the ICI as well as the CPE measurement may also be greatly reduced by allocating the RSs at regular intervals within time. The structure of the RS may form a block by a regularly continuous sample, and the RSs can be allocated at regular intervals between the blocks. According to the RS structure, the RS structure illustrated in FIG. 22 shows a case where the size of the block is "1."

The method of using the phase difference between the RSs spaced apart from each other at regular intervals may be applied to a system using multiple carriers.

Figure 23:
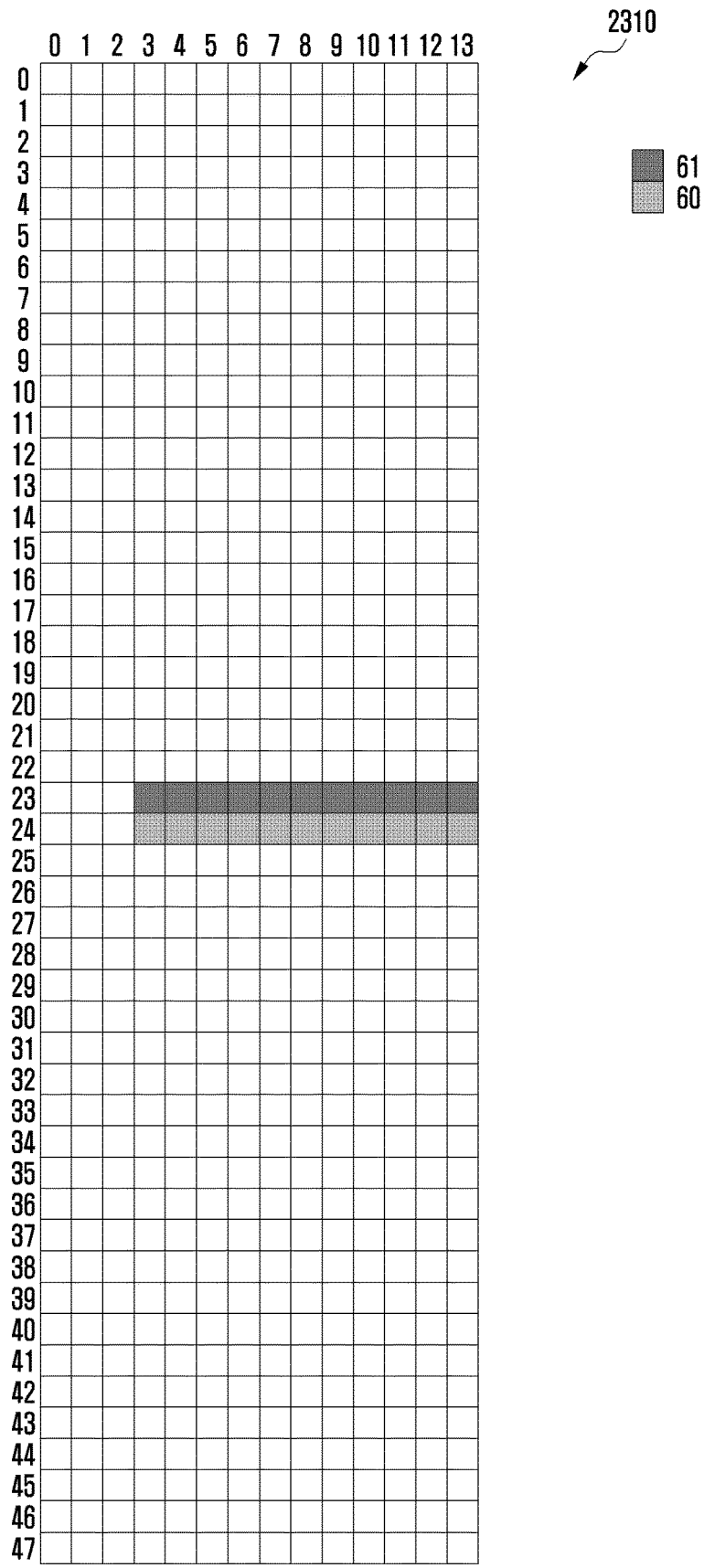
FIG. 23 is an illustration of an RS for orthogonal frequency-division multiplexing (OFDM) based phase noise estimation according to an embodiment of the present disclosure.

FIG. 23 is an illustration of an RS for OFDM-based phase noise estimation according to an embodiment of the present disclosure.

Referring to FIG. 23, reference numeral 2310 represents an RB, where a horizontal axis represents the OFDM symbol and a vertical axis represents the subcarrier index.

The RS may be allocated to each OFDM symbol in a certain time interval of a specific frequency, and the terminal/base station may estimate the phase noise using the RSs allocated to each symbol within a resource to which a scheduled data channel is allocated. As described above, the structure of allocating the RS to each OFDM symbol of a specific frequency resource is an RS structure in which the CPE of the ICI and the CPE caused by the phase noise is easily estimated. To estimate the ICI, more RSs are required for the frequency axis.

In the present disclosure, the RS structure for estimating the phase noise based on the SC-FDMA suitable for the uplink transmission of the terminal requiring the low PAPR will be described with reference to various embodiments.

Figure 24:
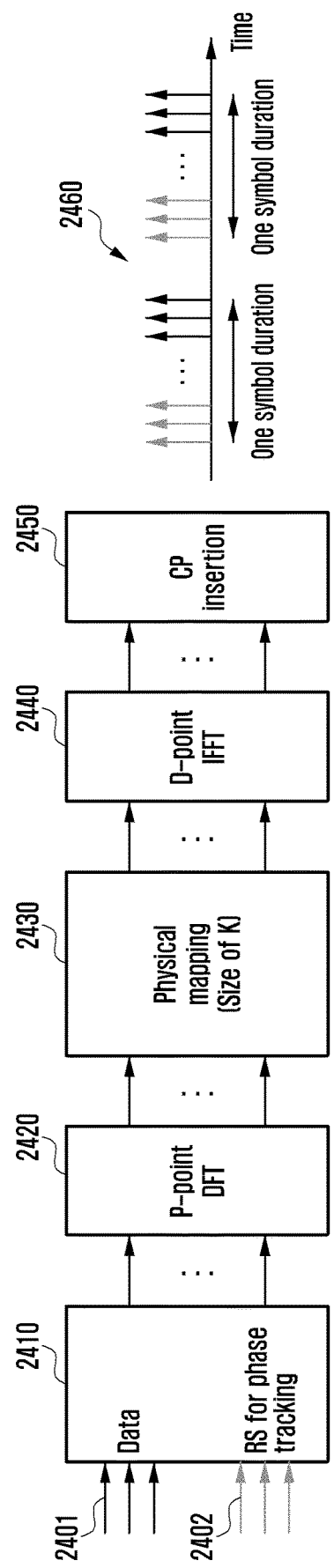
FIG. 24 is a block diagram of a structure for generating an RS allocated in a time domain according to an embodiment of the present disclosure.
Figure 25:
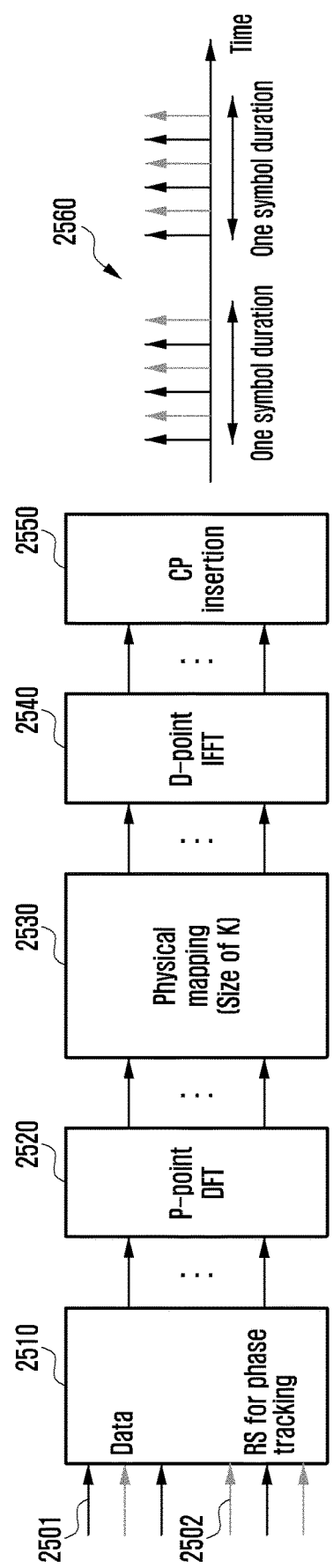
FIG. 25 is a block diagram of a structure in which RSs are distributedly allocated in a time domain according to an embodiment of the present disclosure, in which the RSs are allocated to be time-divided within data and symbol durations.

FIGS. 24 and 25 are block diagrams illustrating the structure of the RS allocated in the time domain.

Referring to FIG. 24, an RS structure is illustrated in which the RSs are consecutively allocated in the time domain and the RSs are allocated to be time-divided within data and symbol durations.

In reference numeral 2410, the transmitting end may allocate data 2401 and RS (2402) by time division (e.g. p samples in total). The transmitting end may perform a discrete Fourier transform (DFT) having a p length in reference numeral 2420. In this case, if the transmitting end is a base station, the receiving end is a terminal, and if the transmitting end is a terminal, the receiving end is a base station.

Thereinafter, assuming that the number of subcarriers corresponding to the operating bandwidth is K, the transmitting end maps the DFT result to p subcarriers among K subcarriers in reference numeral 2430. The mapping method may refer to physical resource mapping rules specified in the specification. If the physical mapping is completed, the transmitting end may perform an inverse fast Fourier transform (IFFT) process having D lengths in reference numeral 2440 and insert a CP in reference numeral 2450 to generate a time domain signal.

The generated time domain signal is transmitted by transmitting the RS and the data in the time division scheme within one symbol duration as shown in reference numeral 2460. The receiving end receives the reference signal transmitted in the structure, and estimates and compensates for the phases of each RS spaced from each other by the symbol duration, thereby reducing the influence of the phase noise. The apparatus receiving the RS uses the RS structure to estimate the phase noise.

FIG. 25 is a block diagram illustrating an RS structure in which RSs are distributedly allocated in a time domain according to an embodiment of the present disclosure, in which the RSs are allocated to be time-divided within data and symbol durations.

Referring to FIG. 25, in reference numeral 2510, the transmitting end may distributedly allocate data 2501 and RS 2502 by the time division (p samples in total). The transmitting end may perform a DFT having a p length in reference numeral 2520.

Thereinafter, assuming that the number of subcarriers corresponding to the operating bandwidth is K, the transmitting end maps the DFT result to p subcarriers among K subcarriers in reference numeral 2530. The mapping method may refer to physical resource mapping rules specified in the specification. If the physical mapping is completed, the transmitting end may perform an IFFT process having D lengths in reference numeral 2540 and insert a CP in reference numeral 2550 to generate a time domain signal.

The generated time domain signal is transmitted by transmitting the RS and the data in the time division scheme within one symbol duration as shown in reference numeral 2560. In this case, the RS and data may be distributedly dispersed and transmitted within one symbol duration, and can be dispersed and transmitted at the same time intervals. The receiving end receives the reference signal transmitted in the RS structure, and estimates and compensates for the phase, thereby reducing the influence of the phase noise.

The apparatus receiving the base station and the RS uses the RS structure to be able to estimate the phase noise. The detailed content thereof is described below with reference to FIG. 26.

Figure 26:
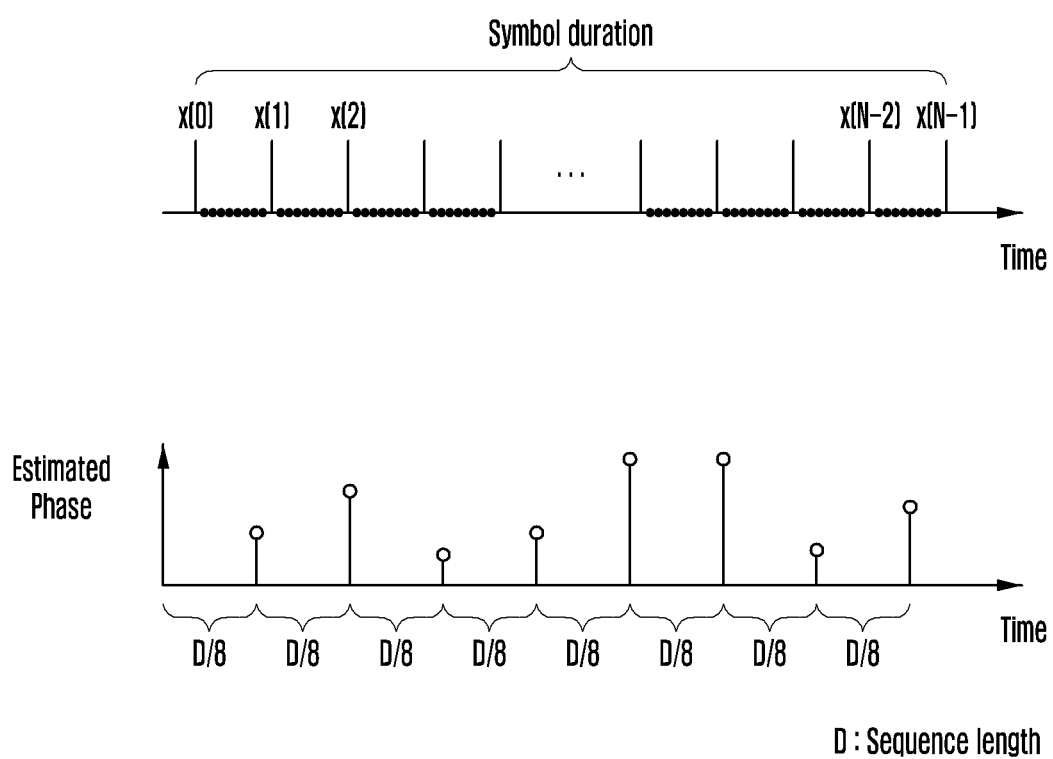
FIG. 26 is an illustration of an RS for estimating phase noise excluding a data part according to an embodiment of the present disclosure.

FIG. 26 is an illustration of an RS for estimating phase noise excluding a data part according to an embodiment of the present disclosure.

Referring to FIG. 26, x represents the phase noise RS having N samples in the time domain, and in one embodiment, eight samples may be allocated at regular intervals. When the RS is transmitted by the structure, since the base station estimates the phase noise varying within the symbol while tracking the phase noise at D/8 intervals, the influence of ICI due to the phase noise may be minimized. In this case, D may indicate the total number of samples.

Figure 27:
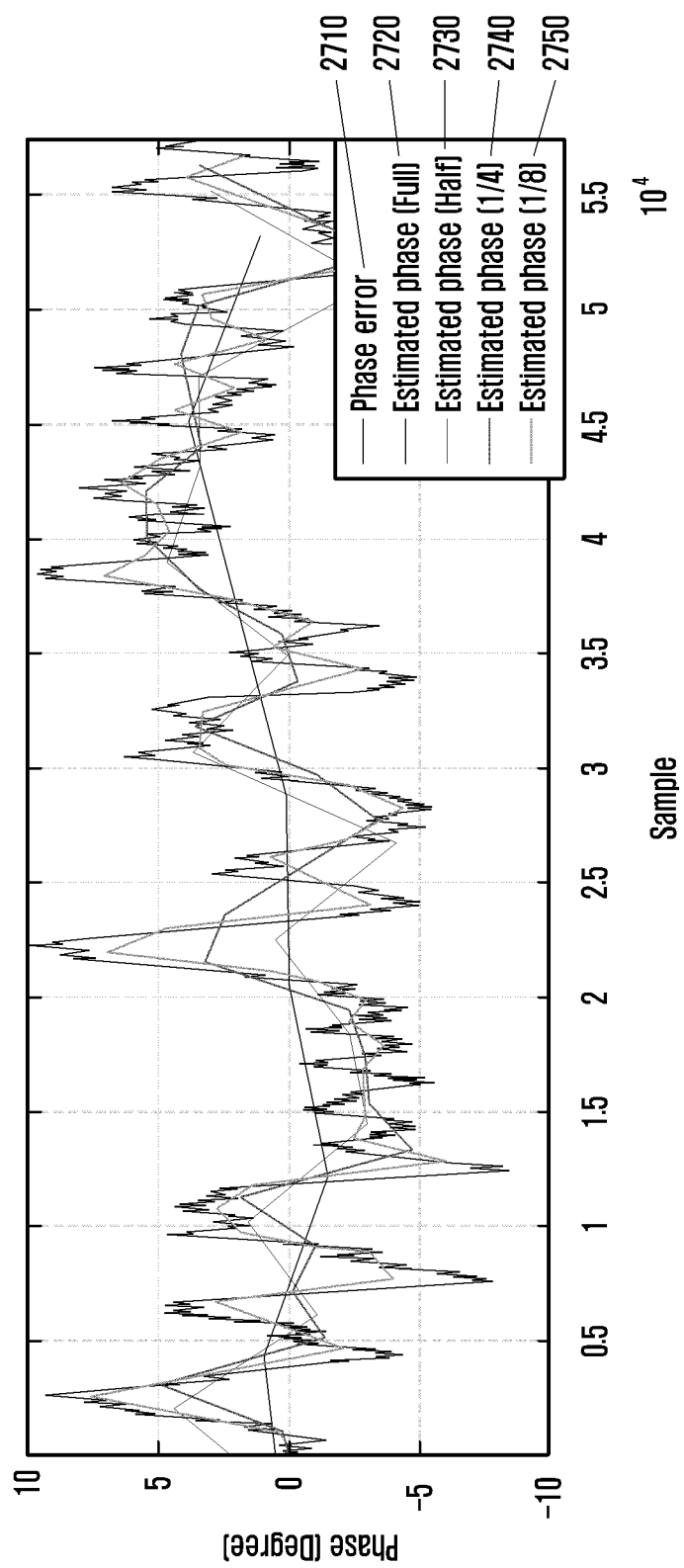
FIG. 27 is a chart of a state in which phase noise is tracked while adjusting an interval of an RS according to an embodiment of the present disclosure.

FIG. 27 is a chart of a state in which phase noise is tracked while adjusting an interval of an RS according to an embodiment of the present disclosure.

Referring to FIG. 27, the relationship between estimated phases 2720, 2730, 2740, and 2750 may be identified depending on a phase error 2710 and the interval of the RS.

It can be identified that the phase estimation value 2750 when the RS interval is short has a more similar phase error value, compared to the phase estimation value 2710 when the interval of the RS is long. That is, the shorter the interval of the RS, the higher the accuracy of the phase noise tracking becomes.

Figure 28:
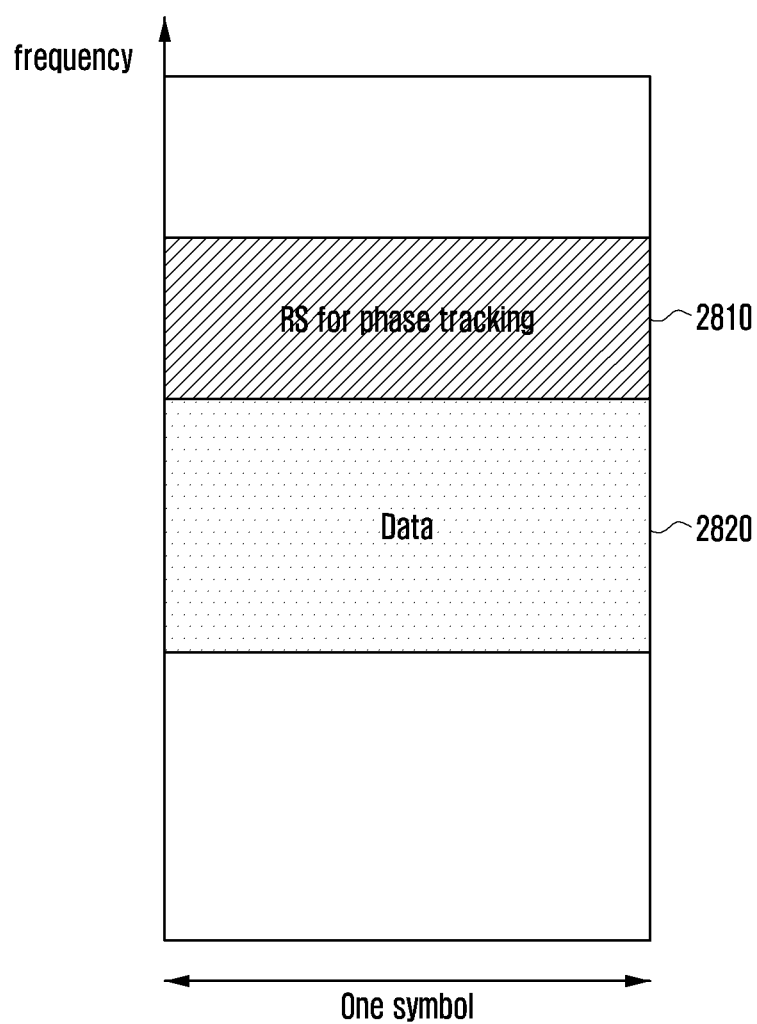
FIG. 28 is an illustration of RSs allocated in a frequency domain according to an embodiment of the present disclosure.

FIG. 28 is an illustration of RSs allocated in a frequency domain according to an embodiment of the present disclosure.

Referring to FIG. 28, an RS 2810 may be consecutively allocated with a band to which data 2820 is allocated. As described above, since the RS and the data are mapped to different kinds of carriers in the frequency domain, the PAPR characteristics becomes worse than that of the RS allocated in the time domain described above. A base station or an apparatus for estimating a phase noise using the RS can estimate an average value of the phase noise in one symbol duration by the CPE.

Figure 29:
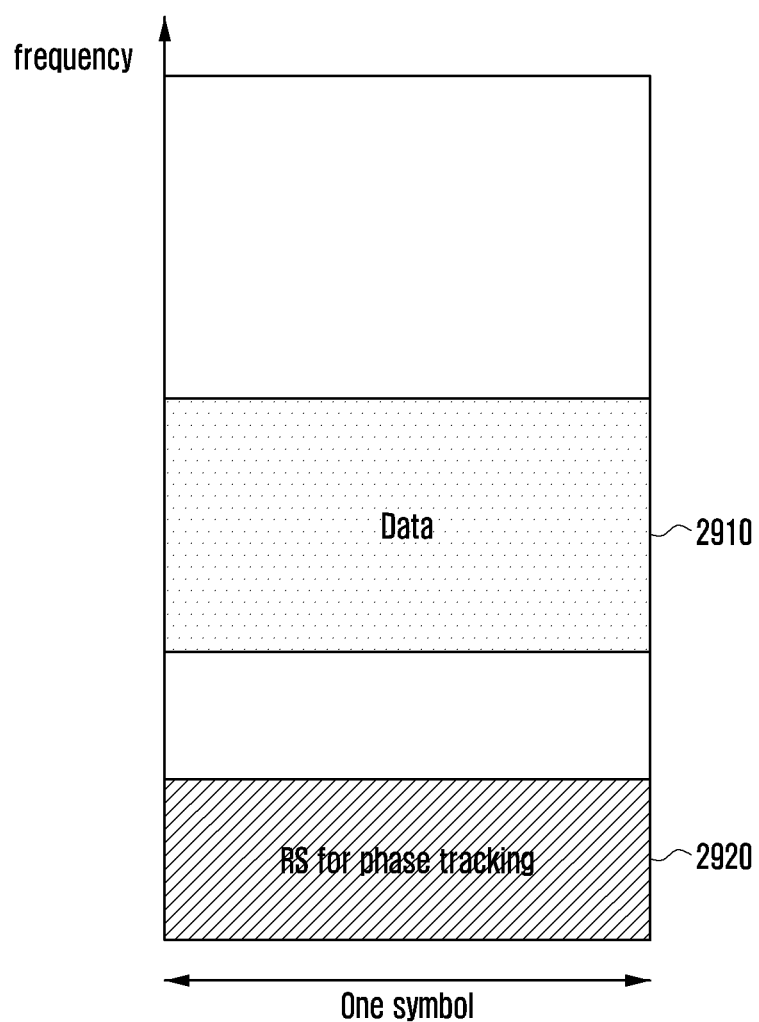
FIG. 29 is an illustration of RSs allocated in a frequency domain according to an embodiment of the present disclosure.

FIG. 29 is an illustration of RSs allocated in a frequency domain according to an embodiment of the present disclosure.

Referring to FIG. 29, an RS 2920 is allocated apart from the band to which the data 2910 is allocated. As described above, since the RS and the data are mapped to different kinds of carriers in the frequency domain, the PAPR characteristics becomes worse than that of the RS allocated in the time domain described above. However, since the band to which the RS 2920 is allocated in the frequency domain and the band to which the data 2910 is allocated are not consecutive, the PAPR characteristics may be improved as compared with the method described above with reference to FIG. 28. A base station or an apparatus for estimating a phase noise using the RS can estimate an average value of the phase noise in one symbol duration by the CPE.

Figure 30:
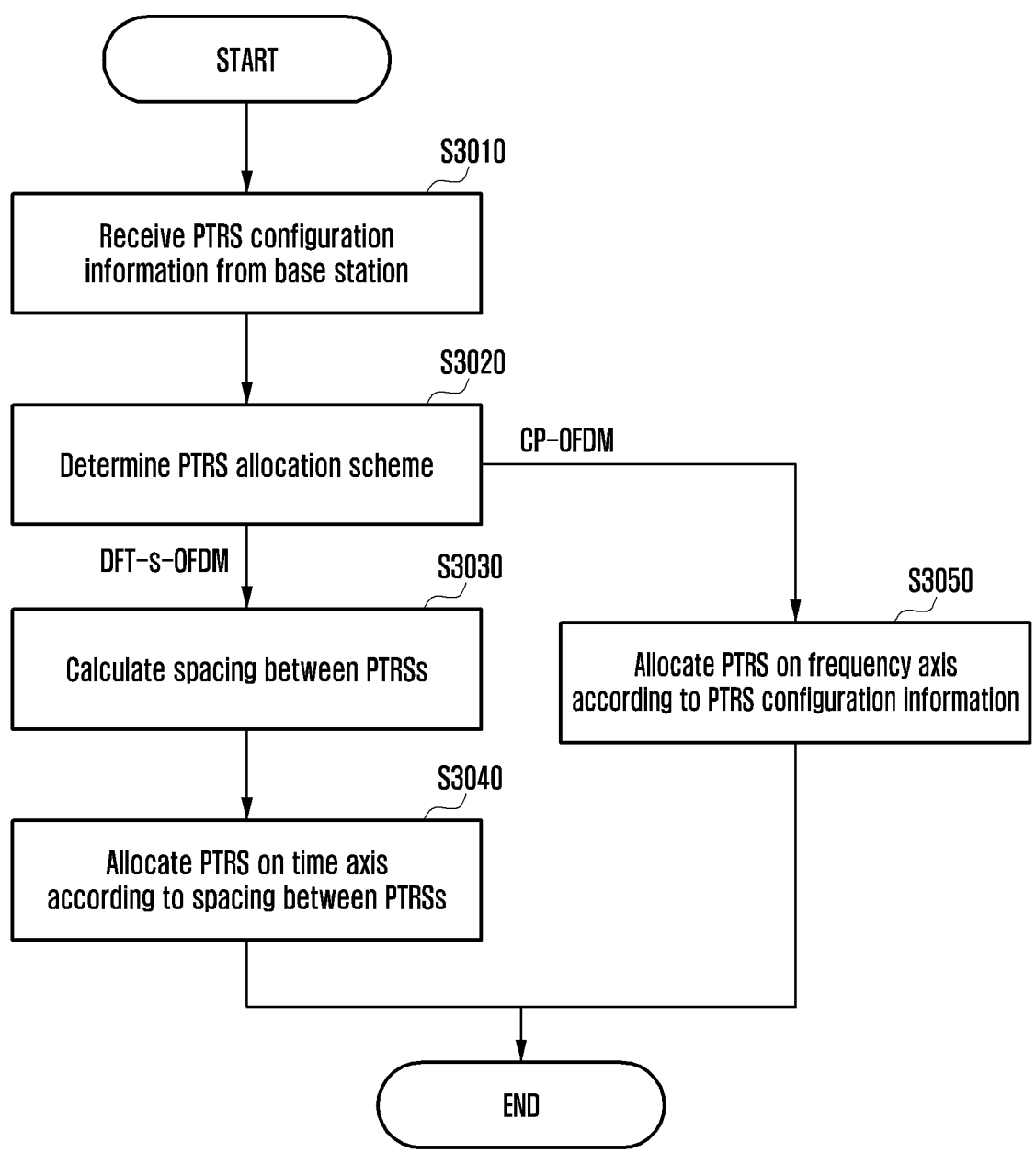
FIG. 30 is a flowchart of a method of a terminal for allocating a distributed RS in a time domain according to an embodiment of the present disclosure.

FIG. 30 is a flowchart of a method of a terminal for allocating a distributed RS in a time domain according to an embodiment of the present disclosure.

Referring to FIG. 30, in step S3010, the terminal receives phase tracking reference signal (PTRS) configuration information from the base station. In this case, the PTRS configuration information received by the terminal may include density information of the PTRS. Here, the density information includes at least one of information informing whether the PTRS is allocated per symbol, each 2 symbols, or each 4 symbols, and information indicating a ratio of data to PTRS in the symbol. In addition, the density information may include at least one of density information with respect to time or density information with respect to frequency.

Thereafter, in step S3020, the terminal may determine the allocation method of the PTRS. That is, the terminal may determine whether the received configuration information is the PTRS for CP-OFDM or the PTRS for DFT-s-OFDM. In the present disclosure, the PTRS for CP-OFDM may be referred to as a first PTRS, and the PTRS for DFT-s-OFDM may be referred to as a second PTRS. The PTRS for the CP-OFDM indicates the PTRS allocated in the frequency domain, and the PTRS for the DFT-s-OFDM indicates the PTRS allocated in the time domain as illustrated in FIGS. 24 to 26.

In case of the PTRS for the CP-OFDM, in S3050, the terminal may allocate the PTRS on the frequency axis according to the PTRS configuration. The terminal may allocate the PTRS according to the time density information or the frequency density information of the PTRS configuration information.

In contrast, in the case of the PTRS for the DFT-s-OFDM, in step S3030, the terminal calculates the spacing between the PTRSs. For example, the terminal may identify the density information based on the PTRS configuration, and the number of samples of the PTRS may be identified based on the density information. That is, if there are a total of D samples on the time axis, the terminal may identify the number of samples of the PTRS using the total number of samples and the density information. Therefore, if the number of samples of the PTRS is P, the terminal may allocate the PTRS within the symbols as the P samples have equal intervals of N/P.

Accordingly, in step S3040, the terminal may allocate the PTRS on the time axis according to the spacing between the PTRSs. That is, the terminal may allocate and transmit the PTRS samples at equal intervals within one symbol duration based on the PTRS configuration information.

Figure 31:
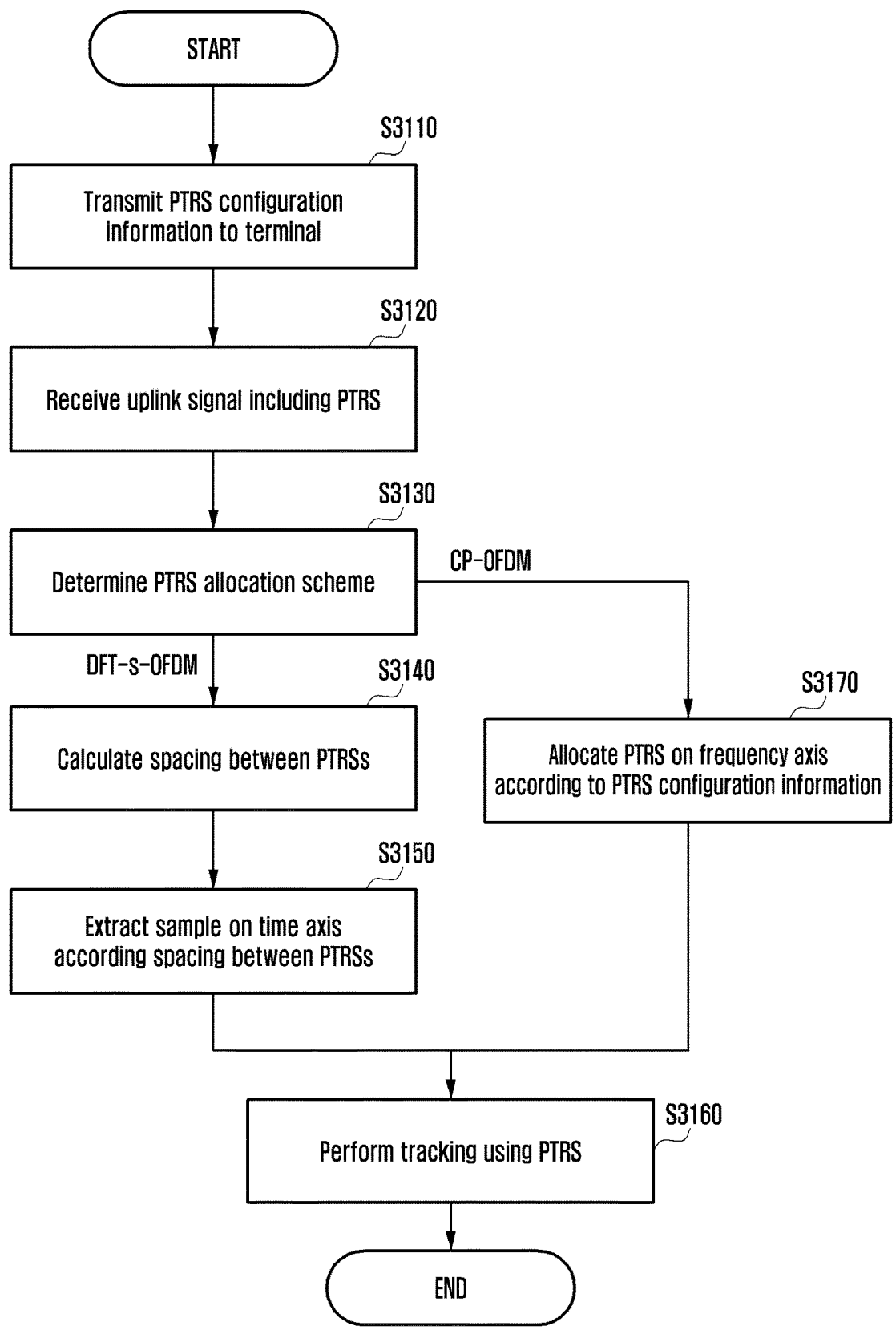
FIG. 31 is a flowchart of a method of a base station for allocating a distributed RS in a time domain according to an embodiment of the present disclosure.

FIG. 31 is a flowchart of a method of a base station for allocating a distributed RS in a time domain according to an embodiment of the present disclosure.

Referring to FIG. 31, in step S3110, the base station transmits the PTRS configuration information to the terminal. In this case, the PTRS configuration information may include the density information of the PTRS. Here, the density information includes at least one of information informing whether the PTRS is allocated per symbol, each 2 symbols, or each 4 symbols, and information indicating a ratio of data to PTRS in the symbol. In addition, the density information may include at least one of density information with respect to time or density information with respect to frequency.

In step S3120, the base station may receive the uplink signal including the PTRS.

Thereafter, in step S3120, the base station may determine the allocation method of the PTRS. That is, the base station may determine whether the received PTRS is the PTRS for the CP-OFDM or the PTRS for the DFT-s-OFDM according to the PTRS configuration transmitted in advance. In the present disclosure, the PTRS for CP-OFDM may be referred to as a first PTRS, and the PTRS for DFT-s-OFDM may be referred to as a second PTRS. As described above, the PTRS for the CP-OFDM means the PTRS allocated in the frequency domain, and the PTRS for the DFT-s-OFDM means the PTRS allocated in the time domain as illustrated in FIGS. 24 to 26.

In case of the PTRS for the CP-OFDM, in S3170, the base station receives the allocated PTRS on the frequency axis according to the PTRS configuration. The base station may receive the PTRS according to the time density information or the frequency density information of the PTRS configuration information. In step S3160, the base station may perform the phase tracking using the PTRS.

In the case of the PTRS for the DFT-s-OFDM, in step S3140, the base station calculates the spacing between the PTRSs. For example, the base station may identify the number of samples of the PTRS according to the density information set by the PTRS configuration. That is, if there is a total of D samples on the time axis, the base station may identify the number of samples of the PTRS using the total number of samples and the number of densities. Therefore, if the number of samples of the PTRS is P, the base station may extract the PTRS within the symbols as the P samples have equal intervals of N/P.

The base station performs the phase tracking within the symbol through the P PTRS samples extracted in step S3160.

Figure 32:
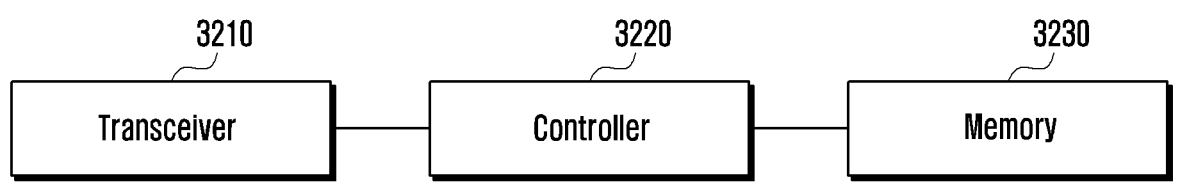
FIG. 32 is a block diagram of a base station according to an embodiment of the present embodiment.

FIG. 32 is a block diagram of a base station according to an embodiment of the present embodiment.

Referring to FIG. 32, the base station may include a transceiver 3210, a controller 3220, and a memory 3230. In the present disclosure, the controller 3220 may be a circuit, an ASIC, or at least one processor.

The transceiver 3210 may transmit and receive a signal. The transceiver 3210 may transmit, for example, the PTRS configuration information to the terminal. In addition, the transceiver 3210 may receive the reference signal.

The controller 3220 may control the overall operation according to an embodiment of the present disclosure. For example, the controller 3220 may receive the PTRSs distributed at equal intervals within one symbol duration, thereby performing a control to perform the phase estimation and compensation.

The memory 3230 may store at least one of the information transmitted/received through the transceiver 3210 and the information generated through the controller 3220. For example, the memory 3230 may receive a reference signal and store information on the result of the determined phase estimate and the compensation.

Figure 33:
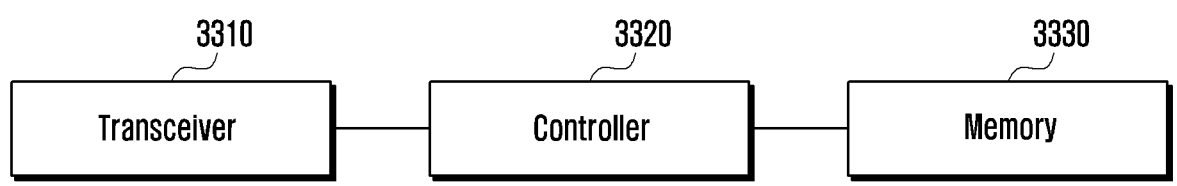
FIG. 33 is a block diagram of a base station according to an embodiment of the present embodiment.

FIG. 33 is a block diagram of a terminal according to an embodiment of the present disclosure.

Referring to FIG. 33, the terminal may include a transceiver 3310, a controller 3320, and a memory 3330. For example, the controller may be a circuit, an ASIC, or at least one processor. The transceiver 3310 may transmit or receive signals. The transceiver 3310 may receive, for example, the PTRS configuration information from the base station. In addition, the transceiver 3310 may transmit the reference signal.

The controller 3320 may control the overall operation according to an embodiment of the present disclosure. For example, the controller 3320 may allocate and transmit the PTRS at equal intervals within one symbol duration.

The memory 3330 may store at least one of the information transmitted/received through the transceiver 3310 and the information generated through the controller 3320. For example, the memory 3330 may receive a reference signal and store information on the result of the determined phase estimate and the compensation.

In addition, in the accompanying drawings illustrating a method, the order of description does not necessarily correspond to the order of execution, and the order of relationship may be changed or executed in parallel.

Alternatively, the accompanying drawings illustrating the method of the present disclosure may omit some of the elements and may include only some of the elements without impairing the scope of the present disclosure.

In addition, although the embodiments of the present disclosure have been described in the present disclosure and illustrated in the accompanying drawings, where certain terms have been used, they are used in a general sense in order to assist in the understanding the present disclosure and are not intended to limit the scope of the present disclosure. It is obvious to those skilled in the art to which the present disclosure pertains that various modifications may be made without departing from the scope of the present disclosure as defined by the appended claims and their equivalents.

What is claimed is:

1. A method of a first base station in a wireless communication system, the method comprising:
   identifying interference related information including information indicating whether interference is over a threshold for each beam pair of the first base station and a second base station;
   receiving, from the second base station, resource allocation information of the second base station and beam index information of the second base station, the beam index information being for transmitting a signal to a second terminal associated with the second base station;
   identifying whether a first terminal associated with the first base station is located in an interference region in which interference between the first terminal and the second terminal is over the threshold, based on beam index information of the first base station, the beam index information of the second base station, and the interference related information;
   identifying, based on the resource allocation information of the second base station, a first resource excluding a second resource that is allocated to the second terminal; and
   allocating, to the first terminal, the first resource excluding the second resource in case that the first terminal is located in the interference region.

2. The method of claim 1, further comprising allocating a third resource including the second resource in case that the first terminal is not located in the interference region.

3. The method of claim 1, wherein identifying the interference related information comprises:
   receiving, from terminals, interference information including an interference strength;
   receiving, from neighboring base stations, beam index information; and
   identifying the interference related information based on the interference information received from the terminals and the beam index information of the neighboring base stations.

4. The method of claim 1, wherein allocating the first resource further comprises allocating, to the first terminal, a resource of a fixed region, in case that the first terminal is located in the interference region.

5. The method of claim 1, wherein allocating, to the first terminal, the first resource further comprises allocating a preferentially available frequency resource, in case that the first terminal is located in the interference region.

6. A first base station in a wireless communication system, the first base station comprising:
   a transceiver; and
   a controller configured to:
      identify interference related information including information indicating whether interference is over a threshold for each beam pair of the first base station and a second base station,
      receive, via the transceiver from the second base station, resource allocation information of the second base station and beam index information of the second base station, the beam index information being for transmitting a signal to a second terminal associated with the second base station,
      identify whether a first terminal associated with the first base station is located in an interference region in which interference between the first terminal and the second terminal is over the threshold, based on beam index information of the first base station, the beam index information of the second base station, and the interference related information,
      identify, based on the resource allocation information of the second base station, a first resource excluding a second resource that is allocated to the second terminal, and
      allocate, to the first terminal, the first resource excluding the second resource in case that the first terminal is located in the interference region.

7. The first base station of claim 6, wherein the controller is further configured to allocate a third resource including the second resource in case that the first terminal is not located in the interference region.

8. The first base station of claim 6, wherein the controller is further configured to:
   receive, from terminals, interference information,
   receive, from neighboring base stations, beam index information, and
   identify the interference related information based on the interference information received from the terminals and the beam index information of the neighboring base stations.

9. The first base station of claim 6, wherein the controller is further configured to allocate, to the first terminal, a resource of a fixed region in case that the first terminal is located in the interference region.

10. The first base station of claim 6, wherein the controller is further configured to allocate, to the first terminal, a preferentially available frequency resource in case that the first terminal is located in the interference region.

* * * * *